United States Patent [19]
Stillman et al.

[11] Patent Number: 5,551,066
[45] Date of Patent: Aug. 27, 1996

[54] NETWORK LINK CONTROLLER FOR DYNAMIC DESIGNATION OF MASTER NODES

[75] Inventors: Robert A. Stillman, Los Altos; James A. Way, Cupertino; Jesse F. Cable, III, San Jose; David Cooper, Saratoga, all of Calif.; James Koskinen, Seattle, Wash.

[73] Assignee: Radio Local Area Networks, Inc., San Jose, Calif.

[21] Appl. No.: 395,206

[22] Filed: Feb. 27, 1995

Related U.S. Application Data

[63] Continuation of Ser. No. 72,042, Jun. 7, 1993, abandoned.

[51] Int. Cl.[6] .................. H04B 7/00; H04J 3/24
[52] U.S. Cl. ............ 455/69; 455/54.1; 370/94.1
[58] Field of Search ............... 370/95.1, 95.3, 370/94.1, 94.2, 85.1, 85.15, 85.2, 85.3, 85.4, 85.5; 455/33.1, 42, 45, 46, 54.1, 56.1, 49.1, 59, 60, 67.1, 67.5, 69, 88, 103, 101, 254, 240, 127, 250.1, 234.1, 62, 63; 375/67, 120

[56] References Cited

U.S. PATENT DOCUMENTS

| | | | |
|---|---|---|---|
| 3,925,782 | 12/1975 | Anderl et al. | 455/69 |
| 4,276,654 | 6/1981 | Nations et al. | 455/160 |
| 4,549,293 | 10/1985 | Christian et al. | 370/95 |
| 4,554,668 | 11/1985 | Deman et al. | 375/1 |
| 4,584,692 | 4/1986 | Yazuka et al. | 455/60 |
| 4,601,043 | 7/1986 | Hardt et al. | 375/1 |
| 4,628,517 | 12/1986 | Schwarz et al. | 455/59 |
| 4,752,939 | 6/1988 | Amoroso et al. | 375/1 |
| 4,807,248 | 2/1989 | Pyatt et al. | 375/1 |
| 4,837,823 | 6/1989 | Ham et al. | 380/34 |
| 4,850,036 | 7/1989 | Smith | 455/179 |
| 4,872,205 | 10/1989 | Smith | 455/58 |
| 4,937,822 | 6/1990 | Weddle et al. | 370/124 |
| 4,939,752 | 7/1990 | Literati et al. | 370/85.6 |
| 5,003,619 | 3/1991 | Morris et al. | 455/69 |
| 5,022,046 | 6/1991 | Morrow, Jr. | 375/1 |
| 5,023,780 | 6/1991 | Brearley | 364/200 |
| 5,036,518 | 7/1991 | Tseung | 371/32 |
| 5,046,066 | 9/1991 | Messenger | 370/94.1 |
| 5,079,768 | 1/1992 | Flammer | 370/94.1 |
| 5,101,406 | 3/1992 | Messenger | 370/94.1 |
| 5,129,098 | 7/1992 | McGirr et al. | 455/69 |
| 5,130,987 | 7/1992 | Flammer | 370/103 |
| 5,142,534 | 8/1992 | Simpson et al. | 370/95.1 |
| 5,168,502 | 12/1992 | Millet | 371/32 |
| 5,170,413 | 12/1992 | Hess et al. | 455/59 |
| 5,206,881 | 4/1993 | Messenger et al. | 375/1 |
| 5,214,790 | 5/1993 | Kozlowski et al. | 455/34 |
| 5,241,542 | 8/1993 | Natarajan et al. | 455/54.1 |
| 5,276,680 | 1/1994 | Messenger | 455/54.1 |
| 5,276,703 | 1/1994 | Budin et al. | 375/1 |
| 5,305,468 | 4/1994 | Bruckert et al. | 455/54.1 |
| 5,327,425 | 7/1994 | Niwa et al. | 370/85.1 |
| 5,355,522 | 10/1994 | Demange | 455/62 |
| 5,359,595 | 10/1994 | Weddle et al. | 370/50 |

FOREIGN PATENT DOCUMENTS

| | | | |
|---|---|---|---|
| 0201308A3 | 11/1986 | European Pat. Off. | H04L 11/20 |
| 0515728A2 | 12/1992 | European Pat. Off. | H04B 10/10 |
| 2223146 | 3/1990 | United Kingdom | 455/254 |
| WO90/06022 | 5/1990 | WIPO | H04B 1/40 |

*Primary Examiner*—Edward F. Urban
*Attorney, Agent, or Firm*—Leo V. Novakoski

[57] ABSTRACT

A link controller for use in a node of a network includes a digital controller (102) that employs a knowledge-based control program (103). The device and method provide flexible master node designation, automatic installation, configuration and reconfiguration, and recognition and correction of network communication problems resulting from interference and other adverse conditions. The knowledge-based control program (103) employs an inference engine and a set of rules to dynamically optimize network configuration. Multipath is managed by locking on to reflected signals when a direct signal is unavailable. Operation is transparent to network users.

25 Claims, 11 Drawing Sheets

1

NETWORK LINK CONTROLLER FOR DYNAMIC DESIGNATION OF MASTER NODES

This is a continuation of prior application Ser. No. 08/072,042 filed on Jun. 7, 1993, now abandoned.

BACKGROUND OF THE INVENTION

1. Field of the Invention

This invention relates to computer networks and, more particularly, to a link controller device and method permitting improved implementation, control, and regulation of a computer network.

2. Description of Related Art

Computer networks are known in the art. However, conventional networks suffer from several disadvantages.

One disadvantage is that such networks typically require permanent designation of a particular node to act as a master control unit. This node typically must be centrally located, and controls the entire network. The requirement of a permanently-designated master node limits the flexibility of the network.

Another disadvantage is that conventional networking systems are expensive to install and maintain. They typically use analog control of transmit and receiver frequencies, and require expert personnel to initially tune and install, as well as to subsequently maintain, the transmitters and receivers. If the network's band of operation becomes noisy or contains interference from other sources, manual reconfiguration by trained personnel is required. Such problems are particularly evident in wireless networking systems, although they may exist in wired and other hard-connected systems as well.

Additionally, any movement, addition, or removal of a node may require realignment and/or reconfiguration of the network to take into account new power and frequency requirements caused by the changes to the network. Such realignment and reconfiguration is typically performed by specialized personnel, and may be expensive.

Many conventional networks, particularly those using infrared or RF wireless technology, require a line of sight between the master node and the other nodes.

Finally, conventional networks are relatively slow.

SUMMARY OF THE INVENTION

In accordance with the present invention, there is provided a link controller for use in a node of a network. The device addresses the above-described problems, permits designation of a new master when appropriate, permits peer-to-peer communication, is easy to install, is self-configuring, and yields very high data transmission rates across the network.

The link controller device is used in each node of the network. The device includes a radio transceiver (101), a digital controller (102) for the transceiver, and a knowledge-based control program (103) that uses a set of rules to maintain the link to the network. The rules have been specially developed to handle complex situations such as initialization, excessive noise at certain frequencies, and loss of a network node. In accordance with application of these rules to the current state of the network, the control program sends instructions to the digital controller specifying changes to the transmit and receive frequencies, transmission power, and the like. For example, if the system detects excessive noise, or a nearby network causing interference, at the base band of the network, the control program may move the base band away from the problematic frequency. Therefore, manual reconfiguration is seldom, if ever, required.

The knowledge-based control program facilitates self-installation. The rules allow the control program to recognize and take into account various operating anomalies during or after installation, configuration, or relocation of nodes. In addition, the device monitors and controls its power level, under the direction of the control program, so as to reduce or eliminate multipath problems automatically, without manual reconfiguration. When necessary, under the direction of the control program, the network may use a packet relay to reach distant nodes. In packet relay operation, a packet is sent to a first node, but includes information in the header indicating that its intended destination is a second node; the first node strips part of the header, adds its own header, and sends the packet to the second node.

A network employing the link controller device described herein may operate without permanent designation of a master node. A master node may be designated either permanently, if desired, or dynamically, so that selection of a new master node occurs under certain circumstances. By removing the need for a permanently designated master node, the system facilitates improved flexibility and adaptability.

The link controller of the present invention uses microwave transmission (frequency 1 gc and higher), and therefore does not require a line of sight to communicate among nodes. Where possible, the system uses multipath to further improve communication among nodes through walls, floors, and other obstacles.

All of the above may be accomplished automatically, without technical installation staff. Additionally, with the inclusion of robust monitoring software and an effective rule-based control program, statistics and configuration information may be obtained from various nodes of the system in order to provide the user with additional instructions or suggestions that may be effective in optimizing the network configuration. These instructions and suggestions may be relatively simple operations that can be performed by any user, such as moving a radiator to a wall mount, or attaching a passive coupler to the ceiling.

Finally, the present invention is faster than conventional network nodes. The present invention allows data transfers of at least 50 megabits per second. Additionally, the network as a whole has at least 28 separate channels, each capable of a transfer rate of at least 50 megabits per second. Therefore, the network has an effective bandwidth of at least 1400 megabits per second, if groups are formed.

The preferred embodiment of the present invention operates in a wireless network, although it may be used in any other type of computer network, including wired and hard-connected networks.

DETAILED DESCRIPTION OF THE PREFERRED EMBODIMENTS

A preferred embodiment of the invention uses the microwave portion of the electromagnetic spectrum. Microwaves have been found to have certain advantages over other portions of the spectrum. One major advantage is power efficiency. Microwaves have relatively low path attenuation, permitting operation with transmitter power of less than 10 mW. The use of such low power transmitters reduces manufacturing costs.

Another major advantage of microwaves is their effectiveness and versatility for data transmission: microwaves may be reflected off various structures, and they do not suffer from the same degree of interference as do other portions of the electromagnetic spectrum.

Transmission Scheme

Figure 1:
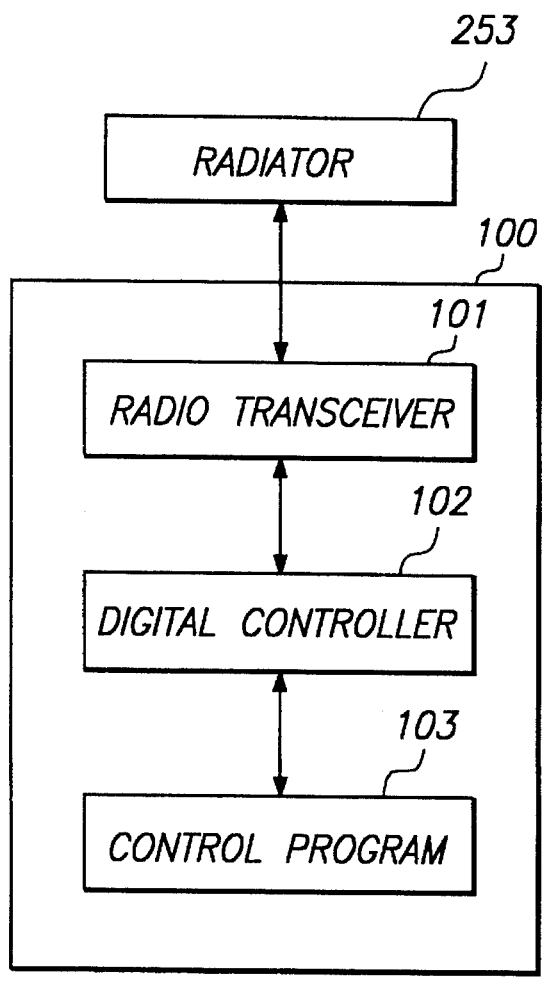
FIG. 1 is a block diagram of a network link controller according to the present invention.

Referring now to FIG. 1, there is shown a block diagram of a network link controller 100 according to the present invention. Link controller 100 provides link level support for a network. Link level support is defined as the first three layers of the seven-layer ISO network standard. Link level support consists generally of the physical layer (layer 1), data link (layer 2), and network layer (layer 3). These layers correspond to the bit, frame, and packet protocols, respectively.

Link controller 100 contains three major components: a radio transceiver 101, a digital controller 102, and a knowledge-based control program 103. A radiator 253 (or antenna) is connected to link controller 100.

In general, transceiver 101 operates at a frequency greater than 1 Gigahertz. In the preferred embodiment, transceiver 101 operates in the X Band (8.4 to 12.6 Gigahertz). Other frequencies may also be used.

Figure 2:
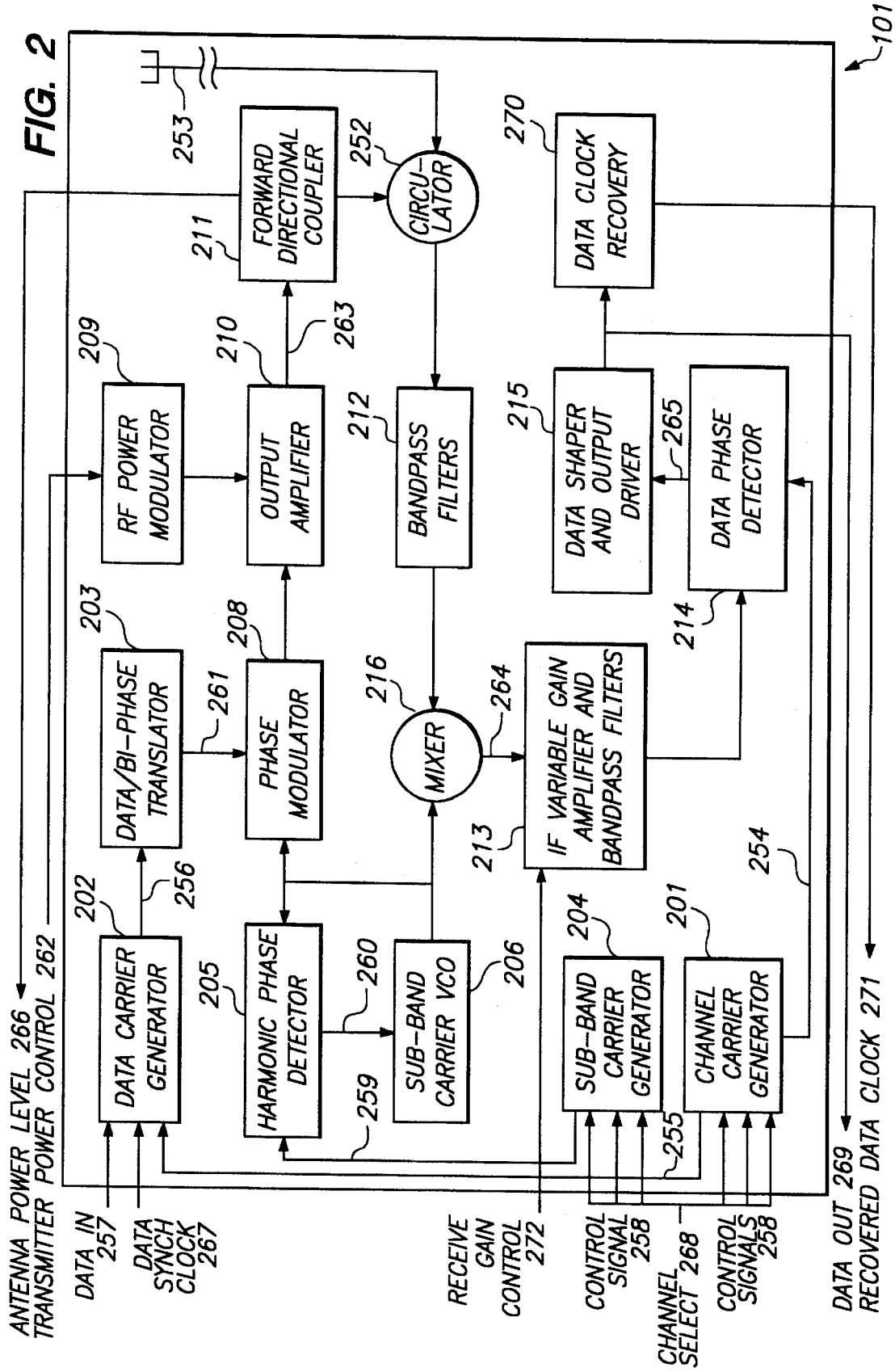
FIG. 2 is a block diagram of a radio transceiver according to the present invention.

Referring now to FIG. 2, there is shown a block diagram of radio transceiver 101 according to the present invention. Radio transceiver 101 includes a transmitter section (blocks 201 through 211) and a receiver section (blocks 212 through 216).

The transmitter section operates as follows. Two carrier generators 201 and 204 are used. Channel carrier generator 201 generates channel carrier 255, and sub-band carrier generator 204 generates sub-band carrier 259. Channel carrier 255 provides multiple subchannels within the transmission band. Sub-band carrier 259 provides multiple channels within a given subchannel.

Each of the carrier generators 201 and 204 contains a frequency-agile oscillator and is controlled by digital controller 102 using digital control lines 258 and channel select line 268. The three control lines 258 permit eight different commands to be provided to the carrier generator. Six channel select lines permit $2^6=64$ separate channels, although in the preferred embodiment, only 28 are used.

Seven of these commands specify changes to the frequency output of the oscillator in the generator, and one command causes the oscillator to shut down.

Channel carrier 255 generated by channel carrier generator 201 is fed to data carrier generator 202. Data carrier generator 202 uses channel carrier 255 along with a data synch clock 267 and data signal 257 containing raw data from a digital source (not shown) to synchronize the data to the carrier. As described below, a phase locked loop is employed, wherein a VCO is divided by a variable modulus divider and fed to a phase comparator. The phase comparator compares this signal with a reference oscillator. If the divider modulus is changed, the loop causes the VCO to change frequency until phase lock is established with the reference oscillator. By appropriate selection of the divider and reference oscillator, many different channels and sub-band sources may be generated. The sources thus generated are then converted up to the transmitter frequency, by any of a number of techniques known in the art, such as frequency multiplication or harmonic phase locking. The result is data carrier 256 containing carrier-synchronized data.

Data carrier 256 is fed to data/bi-phase translator 203, which converts the mono-polar signal to a bipolar signal. The result is bipolar data carrier 261.

Meanwhile, sub-band carrier 259 generated by sub-band carrier generator 204 is fed to harmonic phase detector 205. Harmonic phase detector 205 uses the sub-band carrier 259 to excite a comb generator (not shown) that produces multiple harmonic frequencies. Harmonic phase detector 205 also accepts a signal from sub-band carrier voltage controlled oscillator (VCO) 206. VCO 206 operates at the fundamental output frequency of the transmitter.

The operation of the phase locked loop will now be described. Harmonic phase detector 205 compares the phase relationship between the signals from sub-band carrier generator 204 and VCO 206, and generates control signal 260 containing a DC voltage responsive to this comparison. If the relative phase is zero, then the DC voltage is null. If the relative phase is non-zero, then the DC voltage of control signal 260 is given a unique polarity corresponding to the phase relationship. Control signal 260 is then low-pass-filtered and fed to the voltage control input of VCO 206. Thus, a feedback loop between harmonic phase detector 205 and VCO 206 is established. This feedback loop forces VCO 206 to lock to a harmonic of the frequency of sub-band carrier 259. Any deviation from this phase lock results in a DC voltage on control signal 260 that causes VCO 206 to re-establish phase lock.

The output of VCO 206 is fed to phase modulator 208, along with bipolar data carrier 261. Phase modulator 208 phase modulates the two signals. The system may operate with any number of phases, employing multi-phase modulation techniques that are well known in the art.

The output of phase modulator 208 is fed to output amplifier 210, which is a gain-controllable wide band linear amplifier. The gain of amplifier 210 is controlled by a control signal from RF power modulator 209. Power modulator 209 generates this control signal in response to digital commands on transmitter power control line 262 from digital controller 102. In the preferred embodiment, digital commands 262 are supplied along two lines, one for "power up" and one for "power down". In accordance with these commands, power modulator 209 determines an appropriate power level and sends a signal to amplifier 210. Amplifier 210 amplifies the signal from modulator 208 by the gain specified by power modulator 209, to produce amplified signal 263.

Amplified signal 263 is fed to forward directional coupler 211, which samples, rectifies, and low-pass filters the signal. The output of coupler 211 is an analog DC of the relative power output of amplifier 210. This output is made available to digital controller 102 as a filtered DC signal, shown as antenna power level 266. The output is also fed to circulator 252. Circulator 252 feeds the output of coupler 211 to radiator 253. The purpose of circulator 252 is to isolate the transmitted signal (going from coupler 211 to radiator 253) from the received signal (going from radiator 253 to filters 212), and also to match radiator 253 to the receiver and transmitter sections of transceiver 101.

The receiver section operates as follows. A received signal from radiator 253 passes through circulator 252 and is sent to bandpass filters 212. Received power level may be increased or decreased in response to signals from controller 102. Filters 212 pass all frequencies within the subcarrier frequency range, and exclude all out-of-band signals.

The signal is then sent to mixer 216, which employs a direct conversion technique to extract data from the signal. In direct conversion, the received signal has the same frequency as a local oscillator; combining the two signals produces a zero Intermediate Frequency (IF). Direct conversion is a general technique that is known in the art for application to single sideband, phase modulation, or amplitude modulation. However, for reception of Phase Shift Keyed (FSK) signals only, the system can be substantially simplified by using limiting amplifiers and a digital logic discriminator. Such simplification limits the type of modulation that the receiver may accept, but it results in a relatively inexpensive device.

A direct conversion FSK receiver has a number of advantages over a conventional superheterodyne receiver:

● Most of the gain is at a relatively low frequency, resulting in power savings.

● A direct conversion receiver has the following cost advantages: it does not require any crystal filters or ceramic filters; the number of coils required is limited; no need for IF tuning; only one frequency source (LO) needs to be set up and controlled, compared to three for a double-conversion superhet (2 LOs and a discriminator).

● A direct conversion receiver produces a much simpler and less troublesome frequency response spectrum than a conventional superheterodyne receiver, due to the fact that a superhet may generate unwanted sum and difference frequencies for any number of inputs of the mixer. In addition, the output of the superhet may contain higher-order detection products that may introduce unwanted spurious responses. The most significant such response is image frequency, which can produce a difference frequency component. Direct conversion avoids these problems, because the IF is at such a low frequency that image rejection is essentially infinite and general IF leakage is essentially zero.

In direct conversion PSK, a fundamental relationship exists between the phase deviation and the maximum possible output data rate. Larger deviations permit wider channel spacing and filter bandwidth, and correspondingly higher data rates. By providing a digital discriminator, the input data may be sampled at twice the deviation frequency.

In the preferred embodiment, direct conversion FSK is achieved as follows. The incoming signal, after: being filtered, is directed into two channels, where it is mixed in quadrature with the carrier frequency generated by VCO 206. The mixer output signals are separated in phase by 90 degrees, and are at a frequency equal to the deviation of the incoming signal. Therefore, when they are combined, they cancel each other out, leaving the modulated data carrier 264. The invention could also be practiced with phase separations of less than or greater than 90 degrees. Modulated data carrier 264 is fed to IF variable gain amplifier and band pass filters 213, which amplify and filter the signal. Band pass filters 213 provide channel selectivity, while IF variable gain amplifier provides limiting so that the output can be regarded as digital waveforms. The variable gain of the amplifier may be changed in response to receive gain control signal 272 that is generated by digital controller 102. To achieve desired selectivity, band pass filters 213 must pass the PSK frequency deviation while attenuating adjacent channel signals by approximately 60 dB.

The amplified and filtered signal is fed to data phase detector 214 for digital demodulation. Data phase detector 214 detects the lag or lead relationship among the channels, by comparing the phase of the signal with the phase of reference signal 254 from channel carrier generator 201, which does not contain any intentional phase modulation. Data phase detector 214 is able to select among various frequencies in reference signal 254 in order to demodulate any of a number of channels of data for a given sub-band carrier. The received signal from 213 is phase modulated by the received data. Thus, when these two signals are compared, the result is the recovered data base band. Phase detector 214 outputs this data base band in NRZ format, in the form of DC signal 265, the amplitude of which is directly related to the phase relationship between the received signal and the reference signal.

DC signal 265 is fed to data shaper and output driver 215, which reconstruct the shape of the waveform according to techniques that are known in the art. Recovered data is sent along data out line 269. Data shaper and output driver 215 also may decrease the rise time and fall time of the waveform edges, and adjust output levels according to the requirements of the digital logic that output driver 215 feeds. Data clock recovery block 270 recovers a clock signal from the data, and transmits it on line 271.

The base band of transceiver 101 is adjusted by increasing or decreasing the DC bias voltage to a varactor. A greater voltage lowers the frequency, and a lesser voltage raises the frequency.

Transceiver 101 is able to provide several data channels. Each data channel is separated by approximately two times the bandwidth of the data. The transmitter section of transceiver 101 selects a data channel by switching active elements in the resonating portion of the transmitter to move the center of the base band by the appropriate bandwidth offset. Since the IF is produced by combining the incoming signal with the transmitter frequency in mixer 216 (see above in connection with FIG. 2), the receiver is able to track the received signal.

Radiator 253 may be of any type known in the art, including an omni-directional lensing radiator or a slotted waveguide radiator.

Multipath Management

Multipath occurs when radio frequency waves reflect from the surfaces of physical objects. These reflected waves may be redirected in a path that may differ from the path of the incident wave. Repeated reflections often result in a complex pattern of interfering reflected waves.

A receiving antenna exposed to such a complex pattern may receive multiple instances of the same signal. The multiple instances of the signal are typically phase shifted with respect to each other, and attenuated to varying degrees, depending on the reflecting surface and the distance traveled.

In conventional systems, multipath may present an interference problem in that it may be difficult to discriminate the primary signal from reflected signals. This problem is particularly evident in systems employing amplitude modulation.

The preferred embodiment of the present invention operates in a wireless network that employs phase modulation, wherein average frequency over 360 degrees of conduction does not change. Only the instantaneous frequency is changed. Thus, the system is able to discriminate between two signals that are extremely close in frequency and amplitude. Generally, primary and reflected signals are very close in frequency, so that the difference frequency (the "beats" caused by interference between the signals) is low.

Figure 11:
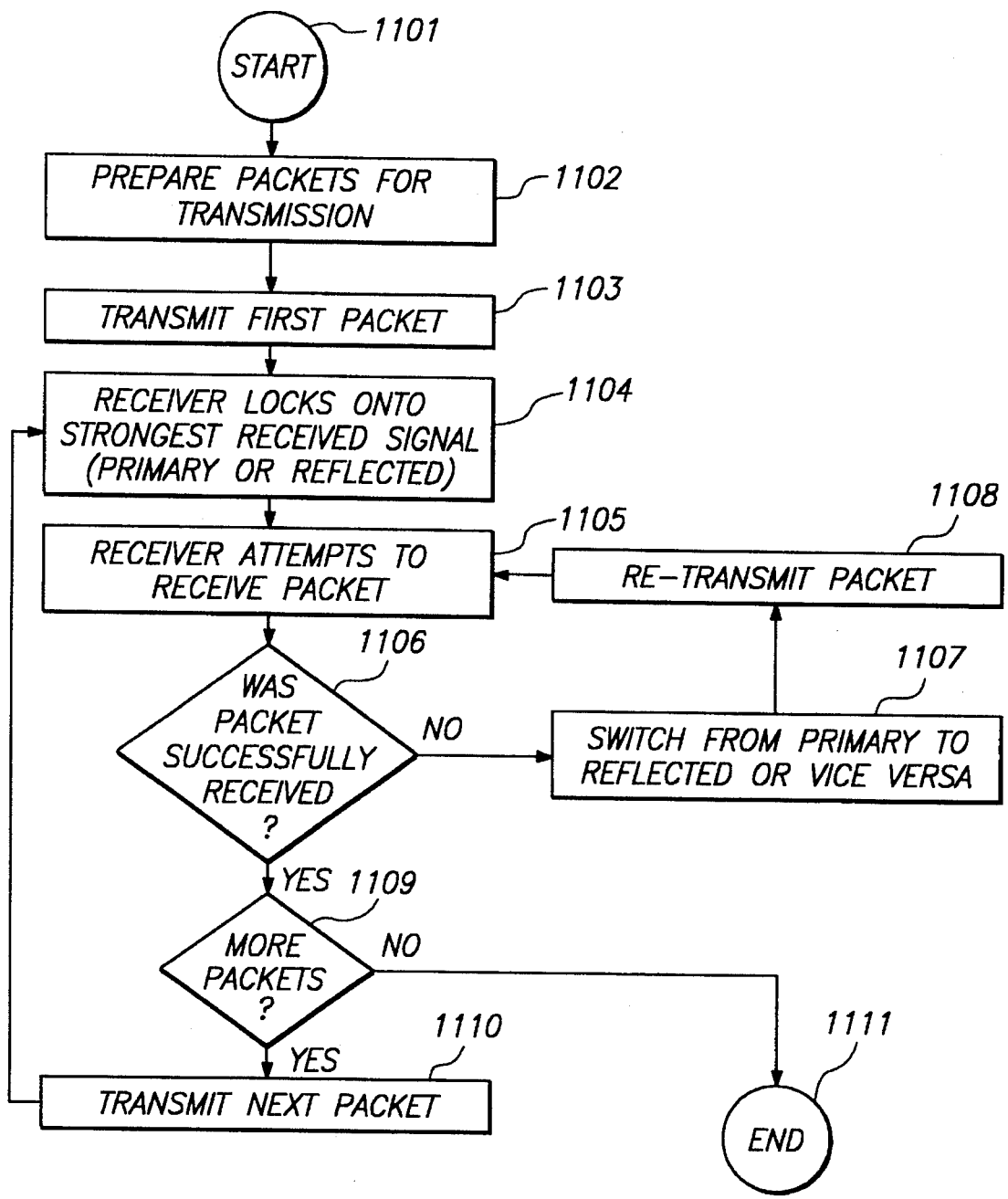
FIG. 11 is a flow chart showing a method of multipath management according to the present invention.

Referring now to FIG. 11, there is shown a flow chart of a method of multipath management according to the present invention. After packets are prepared 1102 for transmission by the transmitting node, the first packet is transmitted 1103. An oscillator in the receiver is phase-locked to the strongest of the primary or reflected signal 1104 with a slew rate or loop band pass filter that will not permit locking to the interfering signal. Thus, the primary and reflected signals may be readily distinguished from one another. The oscillator locks onto either the primary or the reflected signal, as either is a valid signal as long as they are not both processed at the same time. In fact, two (or more) signals may be processed alternately with no detrimental effect on signal quality. In general, the system of the present invention uses primary signals where possible, but is capable of switching to reflected signals when the primary signal is blocked or unavailable. Once the receiver has attempted 1105 to receive the packet, it checks 1106 to see if reception was successful. If not, it switches 1107 either from a direct to a reflected signal path, or vice versa if it was already using a reflected path. The transmitting node then retransmits 1108 the packet, and the receiver again attempts 1105 to receive it. Once the packet is successfully received, the transmitter proceeds to transmit 1110 the next packet, and the process is repeated until there are no more packets.

In order to ensure that the reflected signal is not processed when a direct signal is available, the device of the present invention selectively reduces transmitted signal power using software control, as follows. When a direct signal exists, the phase locked loop will never lock on the reflected signal, since it always locks on the strongest first-received signal. The reflected signal will never arrive before the direct signal, since reflections travel a greater distance. It is known that the signal power of a reflection is always less than 50% of the signal power of the direct signal. Thus, the system can ensure that only the direct signal is received and processed by reducing the transmit power level until the reflected signal is below the minimum detection level of the system. Thus, the phase locked loop will lock only on the direct signal. If there is no direct signal, and only reflected signals exist, then the phase locked loop will lock on the strongest reflected signal.

The transmitting node is responsible for adjusting power levels. Power levels are controlled and adjusted by digital controller 102 of the transmitting node, using digital feedback information found in the Sender State Records of the packet header, as described below.

Each data packet is short enough to be transmitted faster than the radio frequency environment can impose changes that would cause the phase detector to lose its lock. The factors that generally cause loss of lock are physical movement of nodes, or a change in placement of solid objects. Such physical movement may be considered rapid in human terms, but is still slow enough for the system to avoid loss of lock.

For example, suppose 100 blocks of data are to be transmitted. Initially, the phase detector of the receiver locks onto the primary signal. After data block 20 has been received, the primary signal is obscured, so that only a reflected signal is of sufficient signal strength to be received and understood. The phase detector locks onto the reflected signal to the exclusion of the primary signal, so that even if the primary signal became available during transmission of data block 21 (or any subsequent data block), the receiver will maintain its lock on the reflected signal for the remainder of that block. As described above, if the reflected signal is interrupted during a data block, the transmitting node will re-transmit the block.

As frequency separation of the two signals increases, discrimination becomes more difficult. A band pass filter with sharp cutoff is employed to attenuate the out-of-band signals sufficiently, so that they do not compete with the primary signal. This technique is successful only if the pass band is relatively narrow for the relationship between the primary signal and the reflected signal.

Digital Controller

Figure 3:
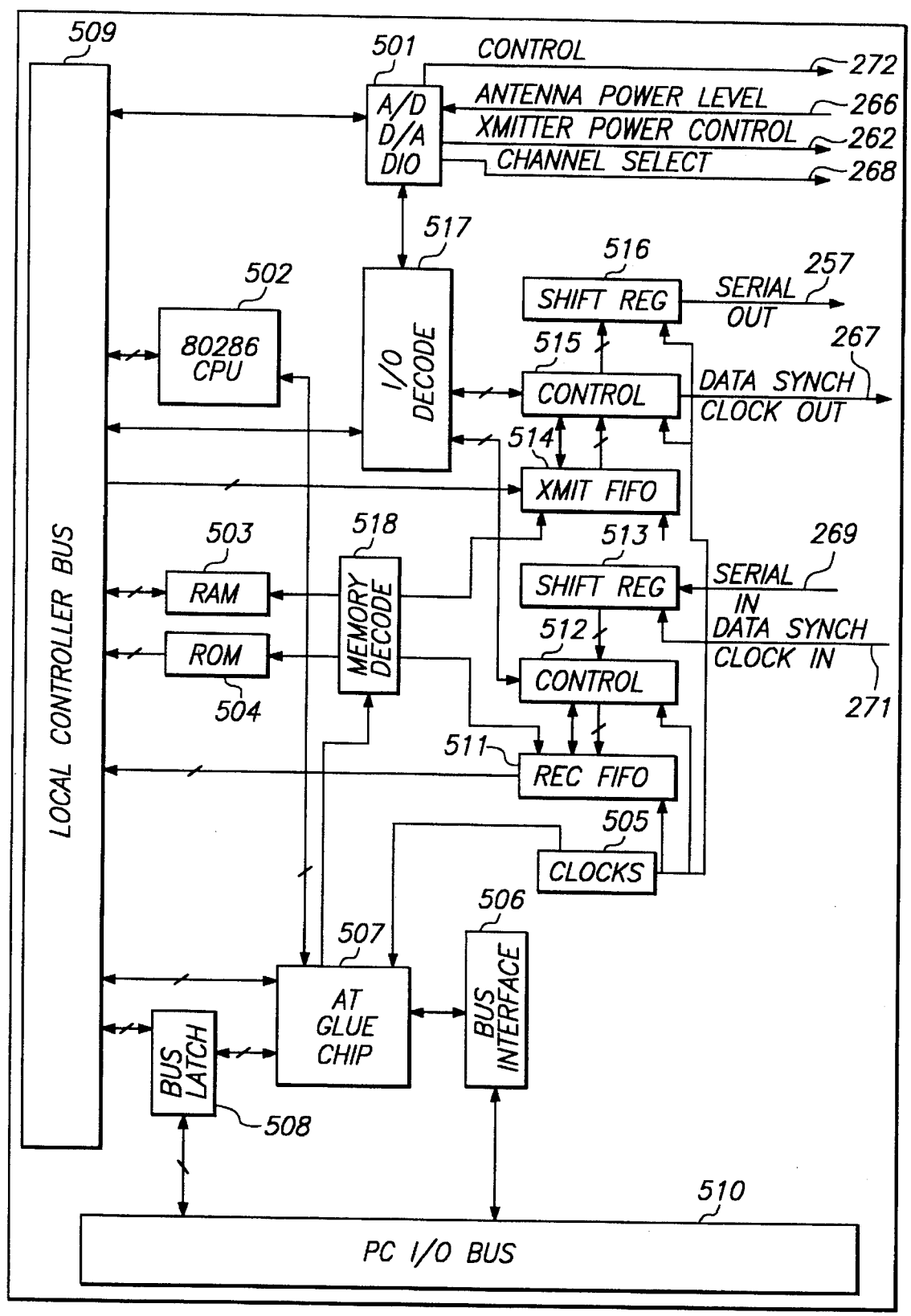
FIG. 3 is a block diagram of a digital controller according to the present invention.

Referring now to FIG. 3, there is shown a block diagram of digital controller 102 according to the present invention. Digital controller 102 includes digital-to-analog and analog-to-digital converters, as well as digital I/O lines, all in block 501, to measure incoming signal strength, to provide voltages needed by the transmitter section of transceiver 101 to vary the power output of the transmitter section, and to select the channel. Converters 501 accept power level data along line 266, and provide commands along transmitter power control line 262, receive gain control line 272 and channel select line 268.

An 80286 microprocessor 502 performs processing operations, using standard random-access memory (RAM) 503 and standard read-only memory (ROM) 504. Clocks 505 generate clock signals for use by various parts of controller 102. Bus interface 506 handles address decodes, commands, and timings between controller 102 and the computer to which it is attached (not shown). AT glue chip 507 handles memory timings, implements DMA, PIC, timers, and the like, that make up an IBM AT. Bus latch 508 latches data between local bus 509 and PC I/O bus 510. Local bus 509 ties together and allows communication among other components, while PC I/O bus 510 represents a standard bus for an IBM PC AT.

Rec FIFO block 511 receives incoming assembled byte/word data from I/O Decode block 517, and buffers high speed incoming data until CPU 502 checks for packet validity. Once :the check has been performed, block 511 empties the data into RAM 503.

Receive control logic 512 detects the start of headers, performs parity checks, detects packet errors and packet length, assembles byte/word data for Rec FIFO 511. Block 512 also contains FIFO strobe logic. Receiver shift register 513 accepts data on line 269 and clock on line 271, both from transceiver 101, and gates the bits.

Xmit FIFO 514 contains a packet to be transmitted. Xmit control logic 515 generates the synch header, parity check, transmit enable, data synch clock out, and strobes for the FIFO and xmit shift register 516. Xmit shift register 516 provides the serial data to transceiver 101 along line 257, synchronized with data synch clock out on line 267.

I/O decode block 517 provides the I/O address decoding for various output/input ports. Memory decode block 518 is used for FIFO-to-memory and memory-to-FIFO operations.

Shift register 513 receives an incoming data signal from the Data Out line 269 of the receiver, also indicated as Serial In line 269 in FIG. 3. Shift register 513 also receives a data synch clock from recovered data clock line 271. Data is recovered from the data signal on line 269 by clocking the signal into shift register 513, and performing a pattern match to synchronize the incoming serial stream into discrete bytes. The bytes are then gated to Rec FIFO block 511 when the end of the synch header is reached, as is known in the art.

Firmware Overview

Digital controller 102 also contains firmware, which includes a small multi-tasking preemptive kernel: The kernel provides a single-threaded process environment that allows inter-process communication and scheduling.

The firmware uses the process environment to facilitate a structured hierarchy of interrelated cooperative processes to minimize interrupt latency. Processes may wait for an event, pass messages through a monitor, share code, and delay themselves in process queues awaiting scheduling and/or resources. This methodology is well known in the art, and is described in Per Brinch Hansen, *Concurrent Pascal Report*, Information Science Department of the California Institute of Technology (1975).

The monitor is a shared process resource that allows only one process at a time to access the code and data. Processes that invoke a monitor are blocked, and must wait in an entry queue for the current process in that monitor to leave or delay itself in a local monitor-controlled process queue.

Code is shared among processes by making all process, monitor, and class code re-entrant. Class code consists of shared process routines that have their data instance in the declaring process. Monitor instances are part of the Initial Process (see below) and are outside the scope of all other processes.

Kernel

The following primitives are used to implement the various elements of the kernel: Initial Process, Init Process, Init Monitor, Init Class, Enter Monitor, Leave Monitor, Resume Process, Delay Process, I/O Interrupt Process, Ready Queue, and Execute Process. Each of these will be described in turn.

Initial Process: This process contains three main parts: power up and self diagnostic test (POST), creation of multi-process data structures (monitors and processes), and creation and assumption of the identity of the currently running process. The POST tests the integrity of the CPU, memory, controller circuits, interrupt controller, and setup for the download of the operating environment from either the host processor or the ROM file. The creation of multi-process data structures consists of a series of calls to initialize class, monitor, and process data structures. It also places the defined child processes in the ready queue and schedules these processes for execution. The Initial Process assumes the identity of each child for execution purposes.

Init Process: Allocates a stack and data area for a process stack. Passes the address of any and all monitors shared by that address. Sets the entry point for the process, and queues the process for execution.

Init Monitor: Allocates the private data area for the monitor and calls the initialization code of the monitor.

Init Class: Allocates the private data area for the class, and calls the initialization code of the class.

Enter Monitor: Serializes entry to the monitor. If a process is already in the monitor, then the invoking process is queued in the monitor gate queue. Otherwise, the gate is closed.

Leave Monitor: Enters a process from the monitor gate queue in the ready queue. If no process is present in the monitor gate queue, then the monitor gate is opened.

Resume Process: The process in the specified process queue variable is placed at the end of the monitor gate queue. This function is only allowed in a monitor.

Delay Process: The process delays itself in the process queue variable specified. If the monitor gate queue is not empty, then the first process in the monitor gate queue is placed in the ready queue.

I/O Interrupt Process: A formless process that preempts the currently executing process either partially or fully.

Ready Queue: A threaded list of processes that are to be executed in first-in first-out (FIFO) sequence.

Execute Process: Maintains the currently executing process. Sets some global variables when invoked. When no child processes are running, the Initial Process is running.

Figure 4:
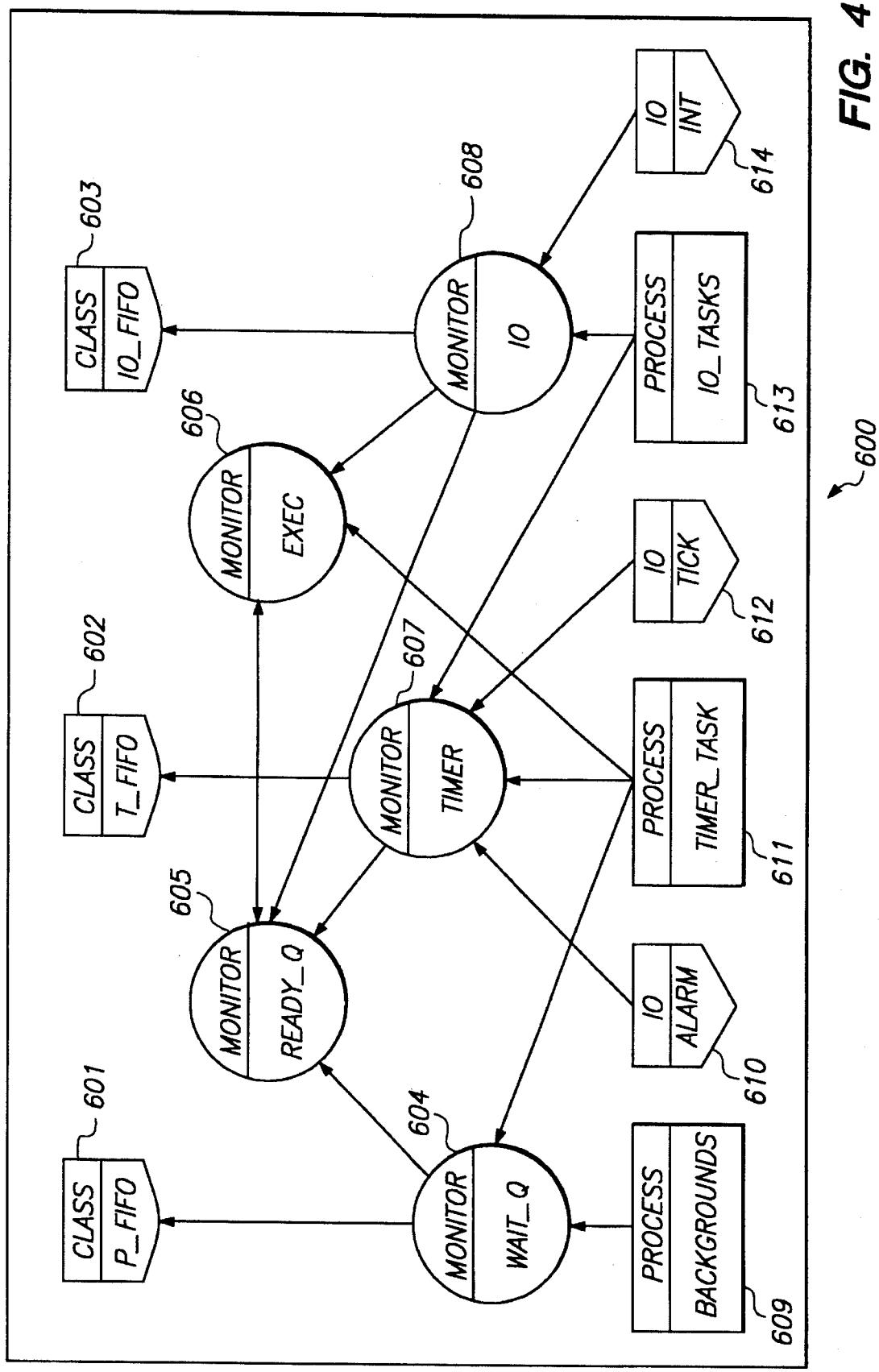
FIGS. 4, 5, 6a, and 6b are directed graph-process diagrams showing the operation of a control program according to the present invention.

The above-described primitives are used to implement the kernel. Referring now to FIG. 4, there is shown a block diagram showing the structure of kernel 600, and its various elements. Each of the elements will be described in turn.

Class P_FIFO 601 is a FIFO queue to hold background processes awaiting execution.

Class T_FIFO 602 is a FIFO queue to hold processes awaiting expiration of a timer to resume execution.

Class IO_FIFO 603 is a FIFO queue to hold processes awaiting certain input/output events.

Monitor WAIT_Q 604 suspends and resumes processes held in class P_FIFO 601, according to commands from process TIMER_TASK 611. WAIT_Q 604 is used for primary time slice scheduling of background processes.

Monitor READY_Q 605 is a FIFO queue of processes scheduled for execution.

Monitor EXEC 606 is the currently executing process.

Monitor TIMER 607 coordinates timer events and timer scheduling among interrupt process ALARM 610, interrupt process TICK 612, process TIMER_TASK 611, and process IO_TASKS 613. Monitor TIMER 607 suspends processes TIMER_TASK 611 and IO_TASKS 613 that use interrupt processes TICK 612 and ALARM 610 to resume execution for timings, fault determination, scheduling, and the like.

Monitor IO 608 schedules process IO_TASKS 613 from interrupt process INT 614.

BACKGROUNDS 609 includes a number of processes that run periodically to monitor and/or control the system, including a simplex process, diagnostic process, and an awareness process. BACKGROUNDS 609 also includes the following processes:

SPATIAL_WATCH: Gauges vectors between nodes (ranging in effect). This process uses a linear algorithm, similar to simplex, to compare all internode signal strength pairs to generate a rough estimate of direction and distance.

XMIT_LEVEL_WATCH: Prepares data for the simplex algorithm. This process monitors changing signal strengths as found in received packet headers.

NODE_WATCH: Prepares data for the simplex algorithm. This process monitors packets and notes when nodes have disappeared from the network.

DIAGNOSTIC_WATCH: Monitors errors in packets and provides some information to the simplex algorithm.

STATISTIC_GATHER: Organizes node and system statistics for presentation to the PC in various formats.

Interrupt process ALARM 610 is a timeout interrupt generally used for long-term scheduling or for fault detection.

Process TIMER_TASK 611 implements the coarse scheduling control of the system, and also handles the packet timeout/retry controls.

Interrupt process TICK 612 is a periodic timer input/output process.

IO_TASKS 613 includes a number of processes that handle input/output operations. These processes use monitor IO 608 and monitor TIMER 607 to await "watchdog" interrupt events.

Interrupt process INT 614 is a generic formless interrupt process of the hardware.

Timer Interface

The firmware relies upon interrupts to perform operations. A key interrupt component is a set of timers that perform message re-sending, status checking, and some process scheduling.

Figure 5:
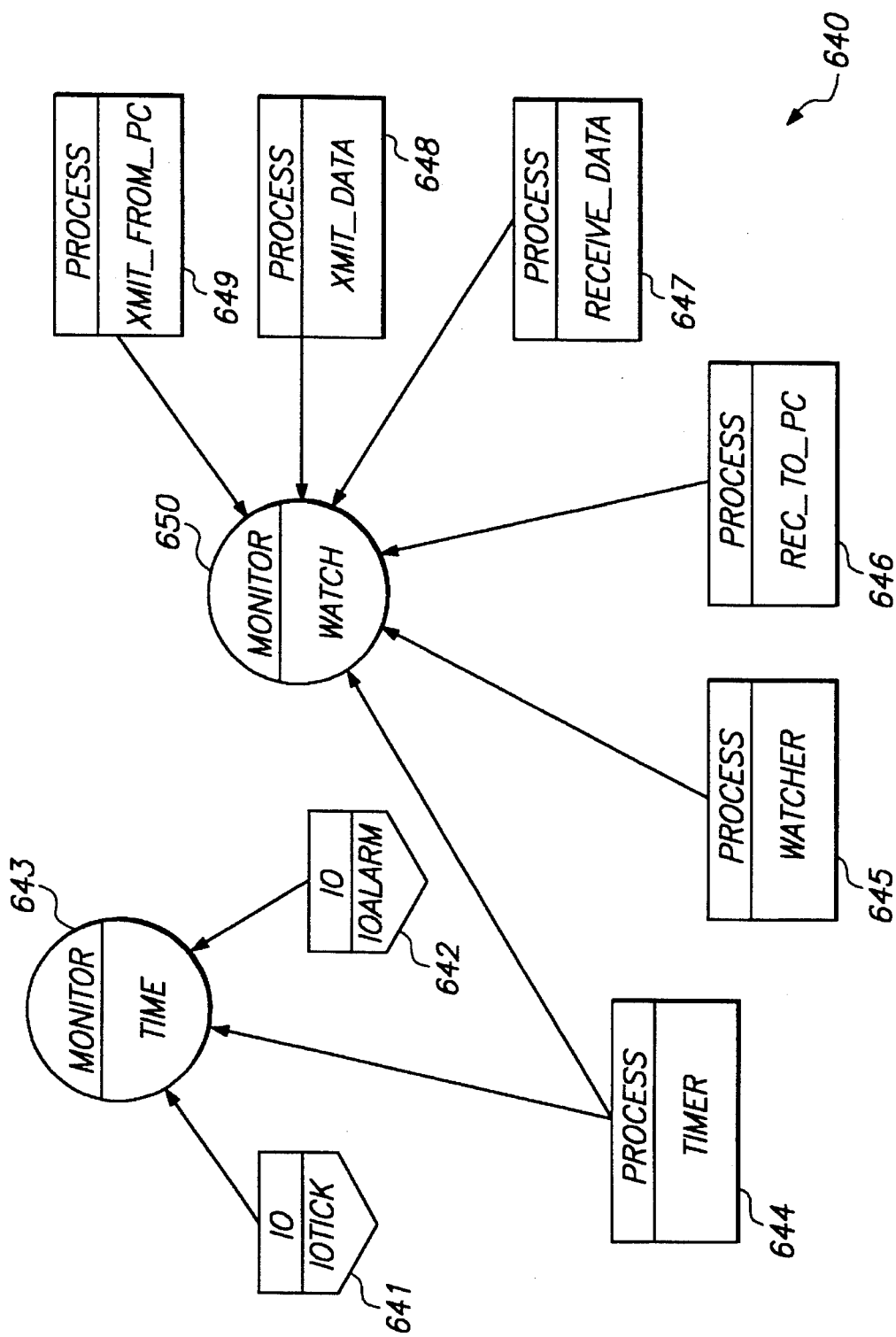

Referring now also to FIG. 5, there is shown a timer interface 640 according to the preferred embodiment of the present invention. It includes the following elements.

Interrupt processes IOTICK 641 and IOALARM 642 are equivalent to interrupt processes TICK 612 and ALARM 610, respectively. These interrupt processes are activated by interrupts and preempt the currently executing process. Once activated, they enter monitor TIME 643 and schedule process TIMER 644.

Monitor TIME 643 is equivalent to monitor TIMER 607.

Process TIMER 644 is equivalent to one of the processes in IO_TASKS 613. It provides timed watchdog operation for various other processes through monitor WATCH 650.

Process WATCHER 645 is equivalent to one of the processes in IO_TASKS 613. It coordinates data transfer to and from the PC, as well as transmit and receive data movement. It activates interrupt process ALARM 610 (for long-term events such as packet retransmission) and handles the short-term free-running timer ticks (for short-term events such as process RECEIVE_DATA 647 and other I/O timeouts).

Process REC_TO_PC 646 is equivalent to one of the processes in IO_TASKS 613. It handles received packets to the PC.

Process RECEIVE_DATA 647 is equivalent to one of the processes in IO_TASKS 613. It handles incoming data from Rec FIFO 511, filters the data, queues it for process REC_TO_PC 646, abstracts control information, and creates tables for use by some of the processes in BACKGROUNDS 609.

Process XMIT_DATA 648 is equivalent to one of the processes in IO_TASKS 613. It forms the data packets, loads Xmit FIFO 514, and enables the channel and transmit clock.

Process XMIT_FROM_PC 649 is equivalent to one of the processes in IO_TASKS 613. It controls data coming from the PC.

Monitor WATCH 650 coordinates DMA, PC bus, and FIFO usages.

Transmit Processing

Figure 6A:
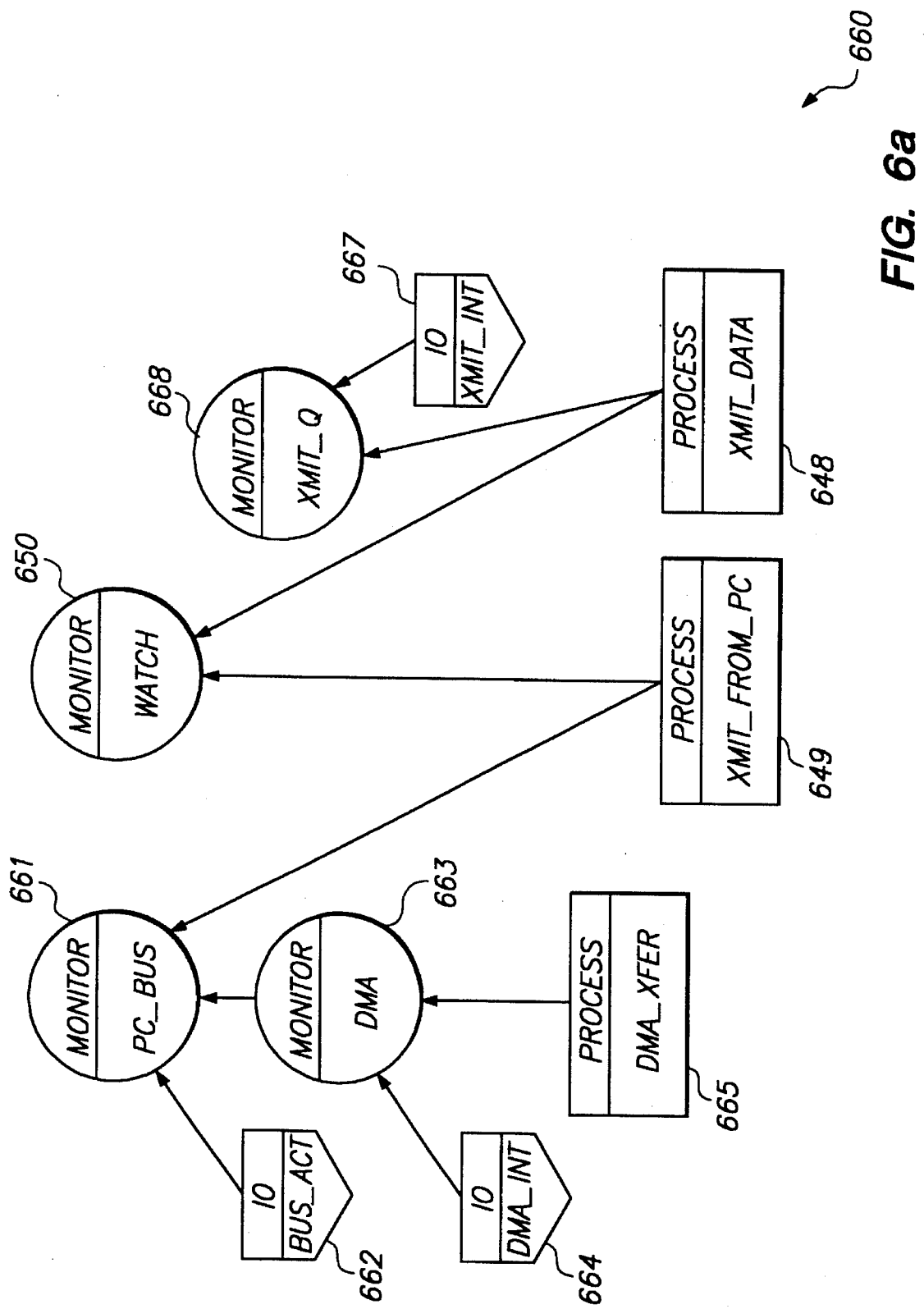

Referring now to FIG. 6a, there is shown a transmit processing block 660 according to the present invention. It includes the following elements.

Process XMIT_FROM_PC 649 is equivalent to one of the processes in IO_TASKS 613. It controls data coming from the PC.

Monitor WATCH 650 coordinates DMA, PC bus, and FIFO usages.

Monitor PC_BUS 661 controls the access of PC I/O bus 510.

Input/output process BUS_ACT 662 handles PC interrupts.

Monitor DMA 663 controls access to the DMA channel.

Input/output process DMA_INT 664 handles DMA terminal count interrupt.

Process DMA_XFER 665 handles all DMA setups and terminations.

Interrupt process XMIT_INT 667 is the transmit FIFO empty interrupt process.

Monitor XMIT_Q 668 delays process XMIT_DATA 648 pending an interrupt.

Receive Processing

Figure 6B:
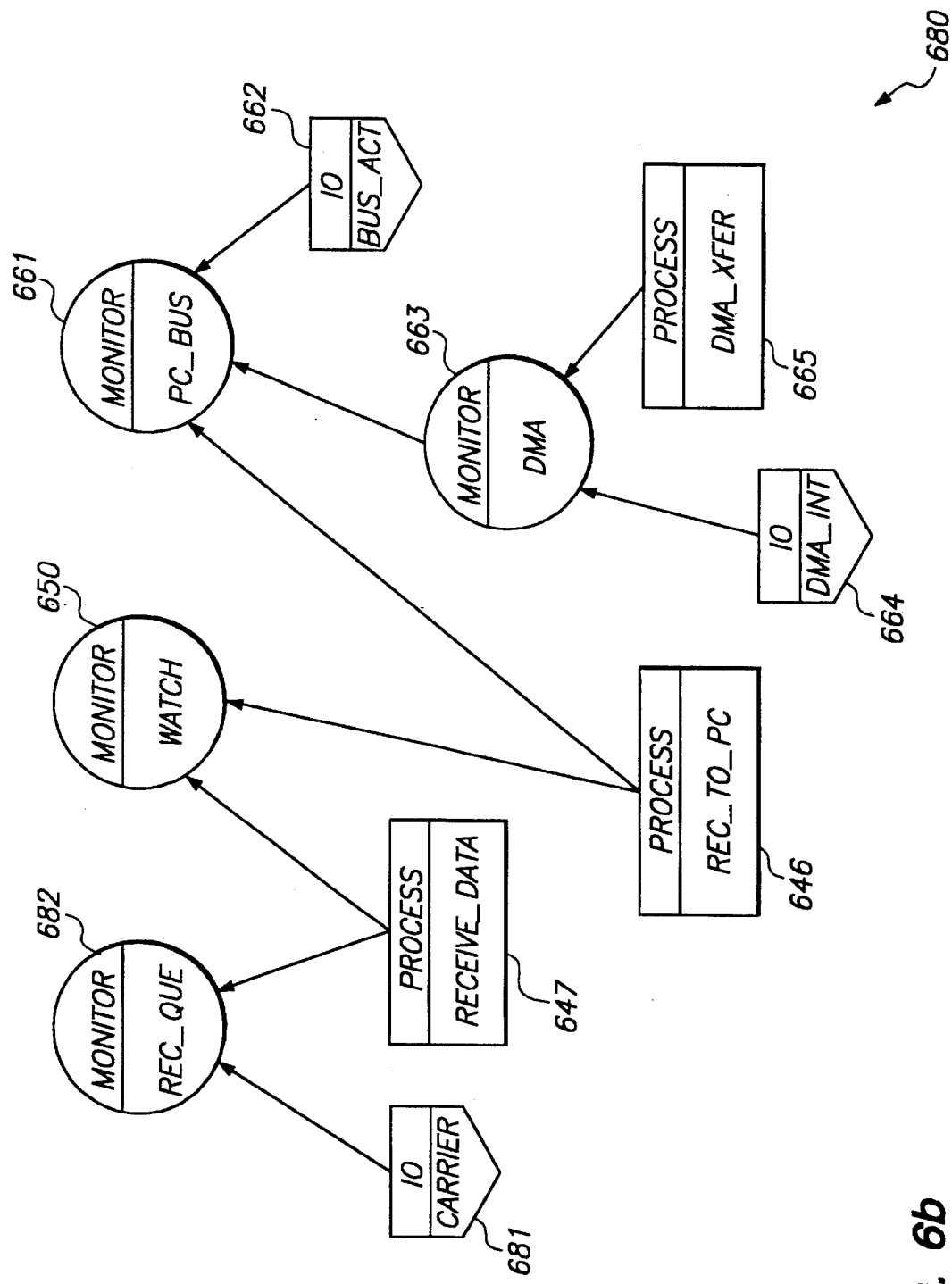

Referring now to FIG. 6b, there is shown a receive processing block 680 according to the present invention. It includes the following elements.

Process REC_TO_PC 646 is equivalent to one of the processes in IO_TASKS 613. It handles received packets to the PC.

Process RECEIVE_DATA 647 is equivalent to one of the processes in IO_TASKS 613. It handles incoming data from Rec FIFO 511, filters the data, queues it for process REC_TO_PC 646, abstracts control information, and creates tables for use by some of the processes in BACKGROUNDS 609.

Monitor WATCH 650 coordinates DMA, PC bus, and FIFO usages.

Elements 661 through 665 are equivalent to the corresponding elements in FIG. 6a.

Input/output interrupt process CARRIER 681 indicates receive data incoming.

Monitor REC_QUE 682 controls the queuing of received data in FIFO and status results.

PC interface

The PC interface (not shown) includes processes sharing the DMA and register interface to the PC bus. The status and control register is updated by a process, in order to ensure consistency (interrupts are off). The command register is handled by a single process which activates the appropriate process to handle processes REC_TO_PC 646, XMIT_TO_PC (not shown), DIAGNOSTIC_WATCH (part of BACKGROUNDS 609), and STATISTIC_GATHER (part of BACKGROUNDS 609).

The data is transferred to and from the PC via DMA from the local memory of link controller 100. Blocking occurs on these processes to allow serial access to the DMA channel.

The register interface consists of the following:

| Register | Type | Offset | Use |
|---|---|---|---|
| Status and Control | Read/write byte | 0 | Error indication, interrupt conditions pending, interface busy, interrupt status |
| Command | Write byte | 1 | Command to perform |
| Data | Read/write word | 2 | Data in and data out (configuration, received packets, transmitted packets, and the like) |

The PC status/control interface is maintained by process DMA_XFER 665. This process is activated by any of the following:

● an interrupt that is generated whenever the PC writes a bit in the interface;

● completion of a transmit packet sequence or a receive packet sequence; or

● detection of a fatal error.

The process then sets the appropriate bits in the interface to generate an interrupt on the PC side. The PC status/control interface consists of the following:

| Bit # | Use |
|---|---|
| 0 | Reserved, reads 0 |
| 1 | Read 1; reset controller (hard reset, enters boot sequence, all local controller memory lost, all status bits cleared); dear to 0 when finished with reset |
| 2 | Read 1; perform command; clear to 0 when command finished |
| 3 | Reserved, reads 0 |
| 4 | Write 1 when fatal (irrecoverable) error occurs; error code is placed in data port |
| 5 | Write 1 when transmit packet operation complete; write 0 when transmit packets status read ("get local status" command complete) |
| 6 | Write 1 when receive packet pending; write 0 when an receive packets read and/or flushed ("get local status" command complete) |
| 7 | Write 1 to enable interrupts to PC; clear to 0 to disable interrupts |

The PC operates on the interface by writing to the command register and setting bit 2 to alert the controller. After the controller has completed the command, it clears bit 2.

The command register accepts a single byte as a command and additional data for the command through the data port. Return information is generated to the data port. The following table describes the available commands:

| Command | Value | Description |
|---|---|---|
| No Operation | 0 | Do nothing; no return value |
| Reset All | 1 | Reset entire controller |
| Reset RX | 2 | Reset receiver hardware and processes |
| Reset TX | 3 | Reset transmitter hardware and processes |
| Get Local Status | 4 | Get local controller status |
| Get Net Status | 5 | Get network status tables |
| Transmit Packet(s) | 0xN6 | Transmit N packets (N ranges from 1 to 15) |
| Receive Packet(s) | 0xN7 | Receive N packets (N ranges from 1 to 15) |
| Load Program | 8 | Load program to process |
| Write Memory | 9 | Write data to specified memory area |
| Read Memory | 1–10 | Read specified memory to interface |

A description of each command follows:

No Operation: Causes no operation to the controller except to write a "TD" pattern in ASCII to the data port.

Reset All: Causes a reset of the operating environ.

Reset RX: Flushes all receive buffers. Activates any and all network resynch functions. Once completed, clears bit 5 in the status register.

Reset TX: Flushes all pending transmit buffers. Any pending buffers are considered lost, even if received at the other end. Forces a resynch with the network. Once completed, clears bit 6 in the status register.

Get Local Status: Returns information about transmit and receive buffers in the controller. Data format at the data ports is:

| # of Bytes | Description |
|---|---|
| 2 | Length in bytes of remaining fields |
| 1 | Number of transmit packet records (N) |
| 3*N | Transmit packet records. The first two bytes in each record is the ID as set in the transmit packet; the third byte is the status |
| 1 | Number of receive packet records (M) |
| 2*M | Receive packet records. |

Get Net Status: Returns the status table for the network. Data format at the data ports is:

| # of Bytes | Description |
|---|---|
| 6 | This Node ID (MU 802.3 style) |

In response to the information provided by the Get Local Status and Get Net Status commands, the local drivers in the PC at the node may instruct the user to perform some action in order to improve network communication. These instructions may be relatively simple operations that can be performed by any user, such as moving a radiator to a wall mount, or attaching a passive coupler to the ceiling.

Transmit Packet(s): Packet data is transferred to local memory from the PC. Data format of the packet from the PC is:

| # of Bytes | Description |
|---|---|
| 2 | Length in bytes of remaining fields |
| 2 | Transmit packet ID (used for return status) |
| 2 | Transmit control word |
| 6 | Destination node ID (IEEE 802.3 standard) |
| 6 | Source node ID (IEEE 802.3 standard; filled in by controller) |
| 2 | Length of packet in bytes (N) |
| 1 | Type of packet |
| N | 0 to 1590 bytes of user data |

Receive Packet(s): Packet data is queued in local memory. The PC driver determines the number and size of the queued packets from the Get Local Status fields. The PC issues the command, including number of packets, to get one or more packets. The PC gets the high part of the command byte, then awaits command complete status. Then, the PC reads the packets from the data port. Packet data format is:

| # of Bytes | Description |
| --- | --- |
| 6 | Destination node ID (IEEE 802.3 standard) |
| 6 | Source node ID (IEEE 802.3 standard; filled in by controller) |
| 2 | Length of packet in bytes (N) |
| 1 | Type of packet |
| N | 0 to 1590 bytes of user data |

Load Program: Invokes the controller's loader. Optionally passes execution to the loaded program. Data format is:

| # of Bytes | Description |
| --- | --- |
| 2 | Length in bytes of remaining fields |
| 4 | Load address (offset: segment form) |
| 4 | Starting address (0xFFFF; load only option) |
| 2 | Number of relocation offsets (N) |
| 2*N | Relocation offsets |
| M | Loaded program |

Write Memory: Allows the PC to write to any portion of the controller's memory. Data format is:

| # of Bytes | Description |
| --- | --- |
| 2 | M bytes of remaining fields |
| 4 | Write memory start (offset: segment form) |
| 2 | Number of bytes of data to be written |

Read Memory: Allows the PC to read any portion of the controller's memory. When the command has been accepted, the PC reads the data from the data port. Data format is:

| # of Bytes | Description |
| --- | --- |
| 2 | Length in bytes of remaining fields |
| 4 | Read memory start (offset: segment form) |
| 2 | Number of bytes of data to be read |

Returned Status Codes: Data format for status codes returned in data port is as follows:

| Value | Description |
| --- | --- |
| 0 | Operation OK |
| 1 | Command not recognized |
| 2 | Insufficient memory for operation |
| 3 | Data format error |
| 4 | POST - ROM checksum error |
| 5 | POST - RAM integrity error |
| 6 | POST - FIFO error |
| 7 | POST - Control circuitry error |
| 8 | POST - Radio self test error |
| 80 | Packet sent and (optionally) received |
| 81 | Packet queued for sending |
| 82 | Packet being sent |
| 83 | Packet send time out |
| 84 | Packet destination not responding |

Transmit Processes

The transmit processes form packets to be transmitted over the radio. Packets are obtained from the PC command process, formatted for sending, and are sent one packet at a time. Each packet is then queued in a hold queue, until one of the following occurs:

● Acknowledgment is received: packet is released. Required acknowledgment is specified in the packet control information from the PC.

● Timeout occurs: packet is retransmitted, unless the retransmit retry count is exhausted. When exhausted, the packet is released. The retransmit retry count is specified in the packet control information from the PC.

The transmit processes operate as follows:

Packet Data to Serial Out: Process TRANSMIT waits in the XMIT_DATA_IN monitor for activation. It takes the passed packet, registers it, adds the header for the radio and adds it to the end of the FIFO stack in the XMIT_MON monitor. It then registers the packet as being queued in the LOCAL_STATUS monitor and re-enters the XMIT_DATA_IN monitor for more packets.

Process SERIAL_OUT waits in the XMIT_MON monitor for activation. Activation occurs when a packet is placed in the transmit FIFO stack by the TRANSMIT process, by the CARRIER_INT_IO, or by the SERIAL_OUT_FIFO_INT activation. These processes activate SERIAL_OUT and, depending on the type of activation, SERIAL_OUT performs the following functions continuously:

● If transmit serial FIFO stack is empty and a packet is queued, load the packet into the FIFO stack and mark it as being sent in the LOCAL_STATUS.

● If transmit serial FIFO stack is loaded but data is not being transmitted and CARRIER is not present, set band and channel and enable transmission.

● If transmit serial FIFO just emptied (data has been transmitted), then the packet is queued in the XMIT_WAIT monitor, and the packet is marked in the LOCAL_STATUS as having been sent and awaiting acknowledgment.

Packet Send Hold/Acknowledgment/Retry: Process XMIT_HOLD handles the retransmissions. It is activated from the XMIT_WAIT monitor by either an acknowledgment or by a TIMER_ALERT signal from the timer subsystem. If timeout retry is requested for a packet in the holding queue, then the packet is resubmitted to the XMIT_MON monitor. If retries are exhausted, then the packet is released and LOCAL_STATUS is posted for error. If acknowledgment is requested and received, then LOCAL_STATUS is updated with the proper completion code. If no acknowledgment is requested, then the packet is released and LOCAL_STATUS is updated appropriately.

Receive Processes

Serial-In to Packet Data: The process checks the length of the packet and other error indications to verify packet integrity. If the packet is found to be valid, system information is registered and if the packet is for this node, it is passed to process REC_TO_PC 646.

Incoming data is received from the FIFO stack via DMA channel to local memory. When the packet has been fully received, or when receive overrun, receive underrun, parity error or ECC error occurs, an interrupt is generated.

Control Program

Control program 103 is a state machine that monitors the state of digital controller 102 to which it is connected. When the state of digital controller 102 changes, control program may issue commands regarding reconfiguration of the network.

Knowledge-Based Expert System

In order to generate and issue such commands, control program 103 consists of a knowledge-based expert system, including an inference engine and a set of rules. As is known in the art of expert systems (see Barr and Feigennbaum, *The Handbook of Artificial Intelligence*), the inference engine accepts a set of input data representing a state description. In the present invention, such input data may include, for example:

- Object descriptions: node identifiers, network identifiers, ranges of DACs, packet formats for node communication, sub-network definitions;
- Event descriptions: communication attempts between one node and another, responses to queries, adjustment of operating parameters;
- Performance data: data throughput measurements, signal strength, unacknowledged packets indicating loss of communication;
- Meta-knowledge: measured information on average signal strength as related to distance, multipath characterizations, obstacle insertion and removal, types of signal loss, likelihood of noise band avoidance by moving base band.

Many of the rules are heuristic and dynamic in nature. Data and rules are represented in a variant record approach, as is known in the art of language compiler met objects. For each rule, the variant record approach describes the type of rule, its use (such as timed, absolute, observational, or creational), its dependencies on other rules, probabilistic properties (to define "fuzzy" rules), and child rules.

Additionally, one set of rules may be designated for application to certain configurations (such as a factory installation, where there is a great deal of steel near the network), while,another set of rules may be designated for other configurations (such as a conventional office installation).

Rule pruning may also occur, according to techniques known in the art, to simplify or limit the number of rules.

Examples of rules are as follows:

- Event: packet to node X is sent at power level 0.9 of full power and received
- Event: packet to node X is sent at power level 0.2 of full power and received
- Fact: if two or more power levels are found to node X, then an intermittent obstacle exists
- Performance: packet power should be minimized
- Meta-rule: first try low power, then high power; also, determine hit frequency on low power; if hit frequency is greater than a certain percentage, then reverse the rule, to first try high power, then low power The inference engine applies the rule set to the state description corresponding to the current state of the network, and generates a set of outputs corresponding to reconfiguration commands for the network. The control program may permit addition, deletion, or modification of the rules. The engine typically uses goal-oriented backtracking recursive descent algorithms, as are known in the art. The rules typically consist of a series of "if then" statements, and are interpreted using forward chaining methodology. State descriptions may be defined in terms of probabilities associated with the defined goals of the inference engine. Thus, a technique known as "fuzzy" logic may be implemented.

The knowledge-based system is used to reduce the input data set to a set of relatively few outputs. Each output forms a series of commands to be applied to the network. In some situations, where more than one output set is generated, indicating more than one possible configuration for the network, the system may try each of the outputs, apply a performance metric to measure the relative success of the configuration, and feed back the results of the performance metric to the knowledge-based system's rule set in order to refine the configuration process. Thus, the control program 103, including the knowledge-based system, provides the link level support for the network.

The control program requires that one node's digital controller 102 be designated as the master. The master dictates the frequency used in the network to the other controllers 102. Other controllers 102 adjust their frequencies to match that of the master. Frequency adjustment is accomplished in a conventional manner by changing a DC bias on the "cavity" resonator using a digital-to-analog converter (DAC) under the control of the software. By performing such adjustments, the network compensates for frequency drift.

Thus, the present invention employs an inexpensive method of frequency control wherein a common communication frequency is established by a master and followed by all other controllers 102. This method provides the ability to easily move the frequency to another band in order to avoid noise and interference with other networks or communication bands. The method also facilitates establishment of a secondary communication frequency for a designated portion of the network. This secondary communication frequency is accomplished using a second tuned "cavity" that is switchable under software control.

Initialization

The initialization process for each digital controller 102 consists of two parts: power-on self test, and node insertion into the network.

The power-on self test performs standard controller integrity checks (including ROM, RAM, control section verification, and radio checkout). The node insertion step consists of listening to the controller's own traffic to establish that the radio section is operating properly.

After initialization, each controller 102 must determine whether it will become the master.

Method of Designating a Master

Figure 7:
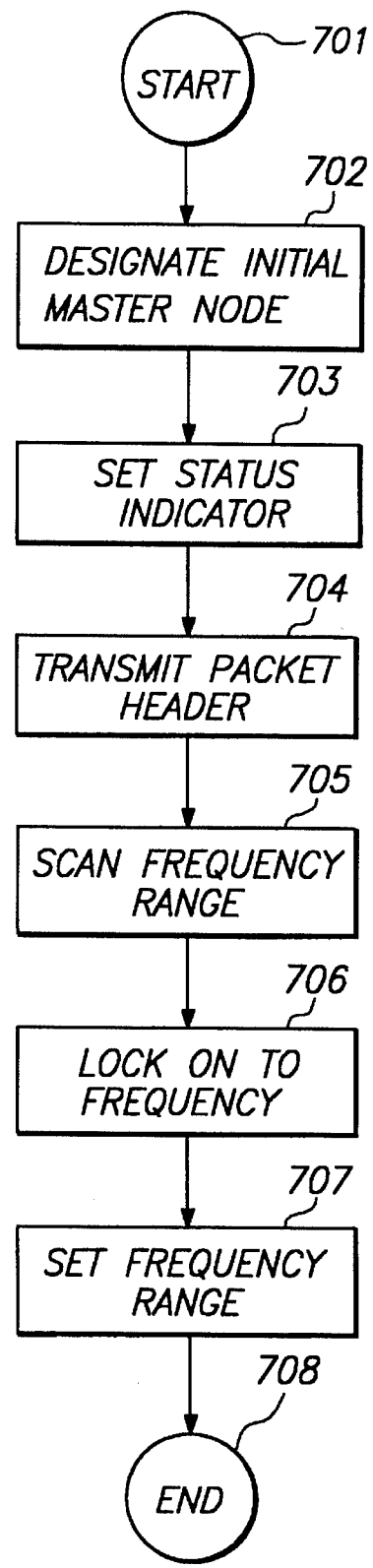
FIG. 7 is a flowchart showing a first method of designating a master node.

The system may use one of two methods to determine a master. Referring now to FIG. 7, first method is shown. The network designates 702 a specific link controller as an initial master, usually based on a selection that is made by a system administrator upon installation. A status bit in the packet header is set 703 to indicate the status of the master, and the packet header is transmitted 704. All the other controllers 102 scan their frequency range 705 and lock onto the master. The frequency range of each controller 102 is defined by the allowable variance in the DC bias to the DAC that controls the base band. The controllers recognize the master by checking the relevant status bit in the received packet. Once the other controllers 102 have locked onto the master 706, they track the master as described above, and set their frequency range 707 to match the master.

Figure 8:
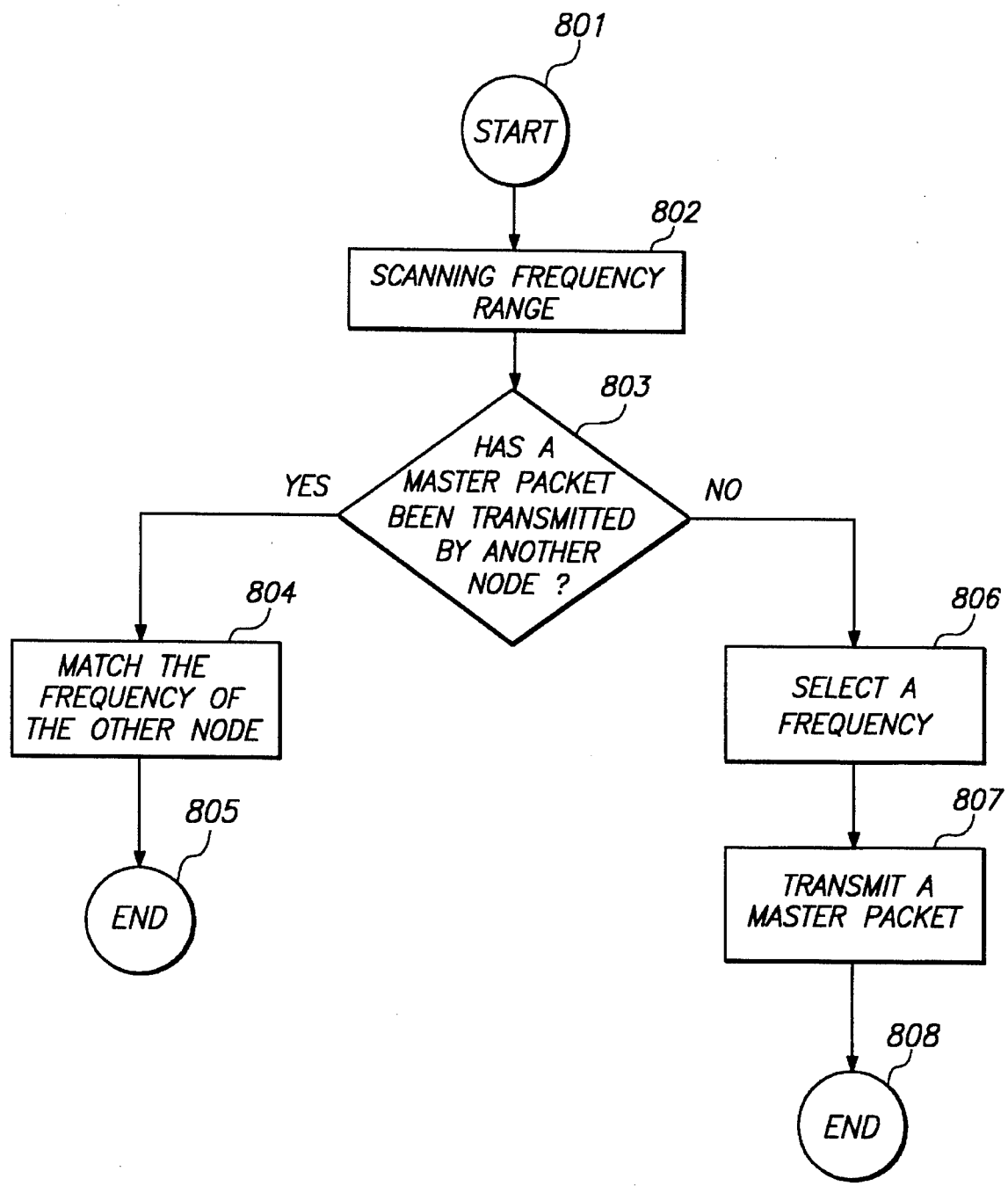
FIG. 8 is a flowchart showing a second method of designating a master node.

Referring now to FIG. 8, a second method of determining a master is shown. This method involves a controller selection process to be performed across all of the controllers in the network. In this method, every time a controller is initialized, the controller must determine whether it will become the master. To make this determination, the controller performs the following steps.

First, the controller scans its frequency range 802 looking for a master_sync packet. A master_sync packet is a packet wherein the master bit within the Sender State Status Byte is set, indicating that the sender has designated itself as the master (see Data Protocols, below). All other data in the packet is the same as for a typical controller data packet, including, optionally, a user-defined portion.

If the controller finds a master_sync packet, that means that one of the controllers in the system has already been designated as the master. The scanning controller matches 804 to the master's frequency and sends the master a "link controller ready" packet. If no master_sync packet is found, the controller selects 806 the midpoint of its frequency range and begins transmitting a master_sync packet 807 at that frequency. Thus, the controller designates itself as the master.

If a master receives a master_sync packet from another controller, it waits for a period of time (the time period may depend on past history information regarding the network) and performs the initialization process again. This procedure takes place under the direction of the control program, which includes rules governing master selection. Such rules include: minimization of signal power while maintaining contact with all nodes; maximization of uptime (the amount of real time that the node is operational); minimization of multipath to nodes; preference for stability based on past history information regarding previous designations of master nodes; and maximization of node uptime as a percentage of network uptime. Since all nodes share the same information and rules, all nodes are capable of arriving at the same decision as to which will be the master. Thus, simultaneous designation of more than one master is avoided.

Frequency Assignment Technique

Once a master is designated, the master can change the network frequency as required. Typically, the frequency may need to be changed due to interference, noise, or other factors. To change the network frequency, the master employs a Frequency Assignment Technique (FAT).

Figure 10:
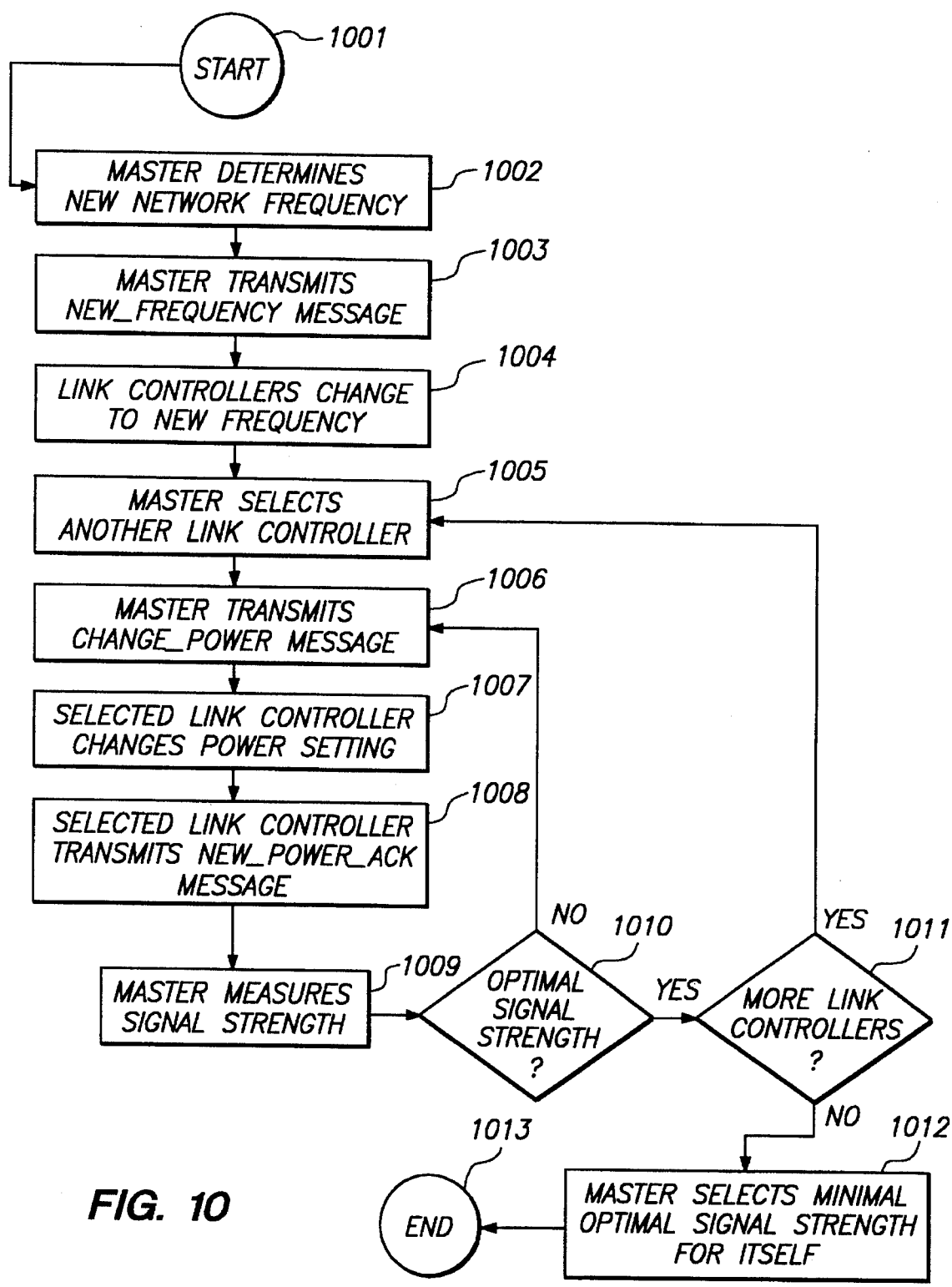
FIG. 10 is a flow chart showing a Frequency Assignment Technique according to the present invention.

Referring now to FIG. 10, there is shown a flow chart of FAT according to the present invention. In step 1001, the process begins. In step 1002, the master determines a new frequency for the network based on availability, interference, levels, and other factors. In step 1003, the master transmits a new_frequency packet announcing the new frequency to all the link controllers in the network. The packet header for this packet also includes a byte indicating the power level at which the packet was sent. Once the link controllers receive the packet, they change to the new frequency in step 1004. All frequency changes are accomplished either by changing the DC bias value in the DAC to the "cavity" resonator, or by selecting another "cavity".

In steps 1005 through 1012, the master performs adjustments to the network by selecting optimal power levels for each link controller.

This is done one node at a time. In step 1005, the master selects a link controller. Then, in step 1006, the master transmits a change_power packet to that link controller. In step 1007, the link controller changes its power level in response to the change_power packet, and in step 1008 it sends a new_power_ack packet back to the master, indicating acknowledgment of the change_power packet. In step 1009, the master measures the signal strength of the received new_power_ack packet. In step 1010, the master determines whether the signal strength is optimal. This determination is made according to the simplex algorithm, a well-known linear programming technique that describes the magnitude and sign of the changes to be made in order to optimize the received signal strength. In addition, the Simplex algorithm specifies the threshold for convergence at the optimal value of signal strength, and specifies methods for determining whether the converged value is the true optimal value or an artifact of errors in the data. The simplex algorithm is described in S. I. Gass, *Linear Programming Methods and Applications*, 2d ed., New York: McGraw-Hill, 1964; G. Hadley, Linear Programming, Reading, Mass.: Addison-Wesley, 1962; and A. F. Carley and T. H. Morgan, "Computational Methods in the Chemical Sciences": Chichester, Ellis Horwood Limited, 1989.

The simplex optimization is performed using variables representing the following:

● Previous and current signal strengths among nodes;
● Channels used;
● Previous channel interferences found;
● Previous master history;
● Previous node traffic history;
● Error rate; and
● Previous and current spatial relationships.

Other variables may also be used. In general, the variables are described by a value, range, and statistical range. Variables may represent signal level settings, vector values (for spatial data), message counts, and Boolean values. To perform the simplex algorithm, a matrix is constructed using known values for the variables, selected variables are relaxed, and the matrix is solved to obtain the optimal signal strengths for the various nodes.

Each node selects its power levels as follows. Included in each node's Sender State Records is the lowest power level, plus a reasonable margin, that the transmitting node saw. Since background traffic (such as heartbeats, acknowledgments, and the like) is often continually present, and since the control program is instructed, at first, to vary the power level for the node to establish these optimal power levels, the system quickly establishes its internode transmit power levels. If communication is lost between two nodes (for example, when obstacles appear, indicating a need for multipath), then further communication attempts are made using the highest available power settings. If communication cannot be established at these high levels, and other nodes also indicate that the node has disappeared, it is presumed to be powered off. Otherwise, a relay is set up to allow access to the node.

If the signal strength is not optimal, steps 1006 through 1010 are repeated until the link controller is transmitting at an optimal power level. Then, in step 1011, the master checks to see if there are any more link controllers to be adjusted. The master repeats steps 1006 through 1011 for each link controller. Then, in step 1012, the master selects a minimal optimal signal strength for itself.

Once the steps of FIG. 10 have been performed, the power level of each node of the network is at a minimum optimal level.

FAT allows the master to change the network frequency to avoid noise and interference, and to automatically adjust power levels for the new frequency. Thus, FAT provides the following advantages:

● Frequency and power level assignment and reconfiguration that is transparent to the user.

● Formation of work groups within the network. Work groups are known in the art. Conventional wire adapters implement work groups by logically tying together two separate Ethernet cabling systems, each with a separate adapter. By contrast, the present invention provides for a single adapter dynamically handling a number of distinct networks. Any adapter may participate in any of the separate networks. This provides improved flexibility and increased system performance. Each node can periodically monitor each of the separate networks under user and/or node control. Each such work group operates at a different frequency and with its own master. The work groups can be reconnected to the overall network or to other work groups under software control. Formation of work groups in this manner enables operation of four networks, each operating at a 50 megabits/second data rate.

● Increased network security by preventing unauthorized nodes from connecting to the network. User-specified encryption keys for node and system access can be monitored to prevent connection of duplicate or foreign nodes. The system may use power level information to ascertain by triangulation the position of each node. By exchanging this information among nodes, by way of a special "user" packet, the system is made aware of spatial relationship among nodes. Appearance of a node whose position does not accord with this spatial relationship may indicate the presence of an intruding node, so that a supervisor or administrator may be notified.

Alternatively, the system may encrypt packets and employ the frequency-agility of the network to implement pseudo-random channel hopping in order to make it more difficult for unauthorized users to connect to the network.

Data Protocols

Figure 9:
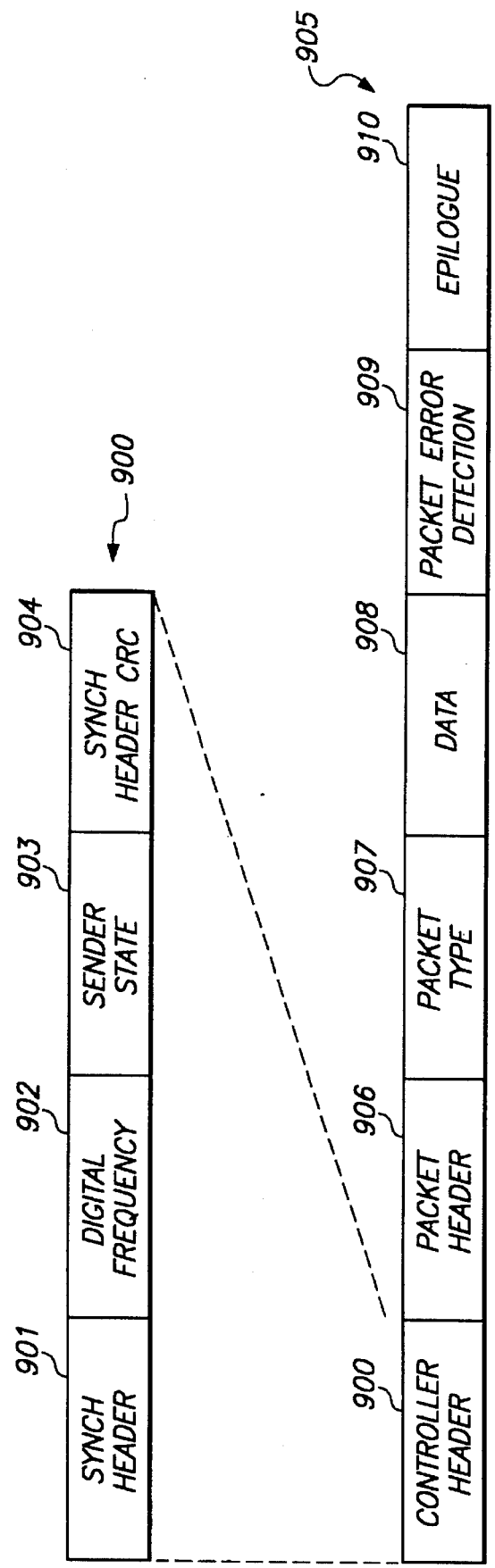
FIG. 9 shows an example of a data packet format according to the present invention.

FIG. 9 shows an example of a data packet format according to the present invention, including link controller header 900. As will be apparent to those skilled in the art, other protocols and formats may also be used in connection with the present invention.

Referring now to FIG. 9, link controller header 900 includes the following items: synch header 901, digital frequency 902, sender state 903, and synch header CRC 904. The information in link controller header 900 describes the node sending the packet, and the view of the network seen by the sending node.

Synch header 901 is used to indicate the start of a packet. In the preferred embodiment, synch header 901 consists of seven bytes of the binary value 10101010 followed by 10101011.

Digital frequency 902 is a two-byte field that specifies the number of bytes in the packet. It also specifies the frequency of the node that is transmitting the packet. Thus, digital control of frequency is accomplished by counting the number of bytes received in the packet and comparing this count against the value of digital frequency 902. If the counted number is less than the value of digital frequency 902, then the base band (controlled by the DAC as described above) must be adjusted downwards; if the counted number is more, then the frequency must be adjusted upwards. The adjustment is performed by the transceiver 101 as described previously.

For example, if the DAC value is 1000, and the number of bytes received in the packet is more than 1000, the DAC value is increased, for example to 1100. If the number of bytes received is less than 1000, the DAC value is decreased, for example to 920.

Sender state 903 contains information describing the node that is transmitting the packet, and its view of the network. This information is used by the receiver of the packet in order to update packet counts and traffic information. Sender state 903 consists of a Sender State Status Byte (indicating such information as whether the transmitter is a Master, or attempting to find a master, its unit type, and whether it is a relay point), a Sender State Count Byte indicating the number of sender state records that are to follow (from 0 to 10), and the sender state records themselves. In some cases, there will be no sender state records. Each sender state record contains the following:

● Four bytes indicating a unique identification code;

● One byte indicating power control information;

● One byte indicating a frequency drift factor;

● One byte indicating frequency control information; and

● One byte indicating packet receive and transmit status.

Sender state 903 further contains information about current packet number received from that node and the current send packet number. Each directed packet has a sequence number (modulo 256) included in it. Synch header CRC 904 is a 16-bit field containing a value that is derived, according to techniques known in the art, from the values of the other fields in header 900. It serves as a validation check to ensure that the information contained in all the fields is correct.

Data packet 905 in the preferred embodiment includes the following items: link controller header 900, packet header 906, packet type 907, data 908, packet error detection 909, and epilogue 910.

Link controller header 900 describes the node sending the packet, and is identical to that described above.

Packet header 906 contains information describing the packet, its destination node, and its source node. It contains six bytes specifying the destination node address, six bytes specifying the source node address, and two bytes specifying the packet length.

Packet type 907 describes the type of data in the packet. It is user-defined, and is one byte in length.

Data 908 is the actual data being transmitted. Its length may range from zero bytes to 1594 bytes.

Packet error detection 909 is a four-byte field employing standard ECC multiple bit error detection methodology to verify the validity of the preceding fields.

Epilogue 910 contains packet termination information. It consists of two bytes containing the binary pattern 00110011.

Thus, the data packet as a whole contains the following fields:

| Field Name | Size (bytes) | Description |
| --- | --- | --- |
| Synch header 901 | 8 | Synchronization bit stream for packet start (seven bytes of 10101010 followed by one byte of 10101011). |

-continued

| Field Name | Size (bytes) | Description |
|---|---|---|
| Digital frequency 902 | 2 | Length of the data packet excluding Synch Header. Used to adjust frequency of transceiver 101. |
| Sender state status byte | 1 | Bit 0: Indicates whether sender is master<br>Bit 1: Indicates whether trying to establish a master<br>Bit 2: Indicates whether network has lost master<br>Bit 3: Indicates whether sender is being as a relay<br>Bits 4–7: Reserved for future use |
| Sender state count byte | 1 | Number of sender state records following. |
| Sender state records | 8*n | Four bytes indicating unique identification code; one byte of power control information; one byte of frequency drift factor; one byte of frequency control information; one byte of packet receive and transmit status. n is user-selectable, from 0 to 10. |
| Synch header CRC 904 | 1 | CRC for link controller header |
| Packet header 906 | 14 | Six bytes of destination node address; six bytes of source node address; two bytes of length. |
| Packet type 907 | 1 | User-defined. |
| Data 908 | m | User-defined. m may range from zero to 1594. |
| Packet error detection 909 | 4 | Standard ECC error detection. |
| Epilogue 910 | 2 | Packet termination. Two bytes of 00110011. |

From the above description, it will be apparent that the invention disclosed herein provides a novel and advantageous network system and method. The foregoing discussion discloses and describes merely exemplary methods and embodiments of the present invention. As will be understood by those familiar with the art, the invention may be embodied in other specific forms without departing from the spirit or essential characteristics thereof. For example, other data packet formats or modulation/demodulation schemes could be employed. Accordingly, the disclosure of the present invention is intended to be illustrative, but not limiting, of the scope of the invention, which is set forth in the following claims.

What is claimed is:

1. In a wireless computer network comprising a plurality of nodes, one of which is designated as a master node for setting a communication frequency among the plurality of nodes, a network link controller associated with each node for configuring, regulating, and controlling the associated node in the computer network, each network link controller comprising:

a radiator for transmitting and receiving modulated signals;

a radio transceiver coupled to the radiator for processing the received and transmitted modulated signals including a signal from the designated master node indicating the communication frequency;

a digital controller coupled to the radio transceiver for providing at least one control signal to adjust selected parameters of the radio transceiver responsive to commands from a control program; and a control program included in the digital controller for monitoring network conditions, analyzing the monitored network condition for a measure of signal quality, and providing commands to the digital controller to improve the measure of signal quality, including designating the associated node as a new master node.

2. The network link controller of claim 1, wherein the transmitted and received modulated signals comprise transmitted and received phase modulated signals.

3. The network link controller of claim 2, wherein the radio transceiver comprises a phase locked loop to maintain a frequency lock with the received phase modulated signals.

4. The network link controller of claim 1, wherein the transmitted modulated signals are transmitted using multiple carriers.

5. The network link controller of claim 4, wherein each carrier operates at a different frequency.

6. The network link controller of claim 5, wherein the at least one control signal includes a signal for commanding the radio transceiver to change the frequency of a carrier.

7. The network link controller of claim 4, wherein:

the transmitted and received modulated signals comprise transmitted and received phase modulated signal; and each carrier operates at a different phase.

8. The network link controller of claim 4, wherein the transmitted modulated signals are transmitted using multiple polarization modes.

9. The network link controller of claim 1, wherein the radio transceiver modulates the transmitted modulated signals and demodulates the received modulated signals using direct conversion.

10. The network link controller of claim 1, wherein the received modulated signals are modulated by a phase shift keyed modulation technique.

11. The network link controller of claim 1, wherein:

the radio transceiver operates at a selectable power level; and the radio transceiver adjusts the selectable power level according to the at least one control signal from the digital controller.

12. The network link controller of claim 11, wherein the digital controller sends the at least one control signal to the radio transceiver specifying adjustments to the selectable power level in response to network conditions.

13. The network link controller of claim 1, wherein the control program included in the digital controller selectively specifies the at least one control signal provided by the digital controller in response to the network conditions.

14. The network link controller of claim 13, wherein the control program comprises:

computer-implemented means for providing a set of rules defining particular actions corresponding to particular network conditions;

means for accepting input describing network conditions; and a computer-implemented inference engine for applying the set of rules to the monitored network conditions and for generating commands corresponding to the particular actions corresponding to the monitored network conditions.

15. The network link controller of claim 14, wherein the control program further comprises means for learning new rules and adding the new rules to the set of rules.

16. The network link controller of claim 14, wherein the input describing network conditions comprises:

object descriptions;
   event descriptions;
   performance data; and
   meta-knowledge.

17. The network link controller of claim 1, wherein the radio transceiver sends and receives the transmitted and received signals using microwave frequencies.

18. The network link controller of claim 1, wherein the radio transceiver selectively employs multipath to avoid obstacles in data transmission.

19. The network link controller of claim 1, wherein the at least one control signal comprises:

a first signal for commanding the radio transceiver to increase transmitted power; and a second signal for commanding the radio transceiver to decrease transmitted power.

20. The network link controller of claim 1, wherein the at least one control signal comprises:

a first signal for commanding the radio transceiver to increase received power; and a second signal for commanding the radio transceiver to decrease received power.

21. The network link controller of claim 20, wherein the at least one control signal further comprises:

a first signal for commanding the radio transceiver to increase transmitted power; and a second signal for commanding the radio transceiver to decrease transmitted power.

22. A method of optimizing a transmit power level for a first node in a wireless network comprising a plurality of nodes, one of which is designated as a master node, the method comprising the steps of:

(a0) determining which of the plurality of nodes is currently designated as the master node;

(a) transmitting a first packet from the currently designated master node to the first node to indicate a change in power;

(b) changing the transmit power level of the first node in response to the first packet being received at the first node;

(c) transmitting a second packet from the first node to the currently designated master node to indicate acknowledgment of the first packet;

(d) measuring the strength of the received second packet at the currently designated master node;

(e) determining whether the strength of the received second packet at the currently designated master node is optimal;

(f) responsive to a determination that the strength is not optimal, repeating steps (a) through (e);

(g) designating a new master node from among the plurality of nodes when steps (a) through (f) fail to provide adequate signal strength; and (h) responsive to designation of the new master node from among the plurality of nodes, repeating steps (a0) through (f).

23. A method of optimizing a transmit power level for a first node in a wireless network containing a plurality of nodes, one of which is designated as a master node, the method comprising the steps of:

(a0) determining which of the plurality of nodes is currently designated as the master node;

(a) transmitting a first packet from the currently designated master node to the first node to indicate a change in power;

(b) changing the transmit power level of the first node in response to the first packet being received at the first node;

(c) transmitting a second packet from the first node to the currently designated master node to indicate acknowledgment of the first packet;

(d) measuring the strength of the received second packet at the currently designated master node;

(e) adjusting at the currently designated master node the received signal strength;

(f) determining whether the adjusted received signal strength at the currently designated master node is optimal;

(g) responsive to a determination that the adjusted received signal strength is not optimal, repeating steps (a) through (f);

(h) designating a new master node when steps (a) through (g) fail to provide adequate signal strength; and (i) responsive to designation of the new master node, repeating steps (a0) through (g).

24. The method of claim 23, wherein step (e) comprises the substeps of:

(e.1) determining values of a plurality of variables describing characteristics of the network; and (e.2) applying a simplex optimization algorithm to the determined values.

25. The method of claim 24, wherein the plurality of variables comprises:

previous signal strength among the plurality of nodes;
   current signal strength among the plurality of nodes;
   channels being used;
   previous channels interferences found;
   previous master history;
   previous node traffic history;
   error rate;
   previous spatial relationships among the plurality of nodes and
   current spatial relationships among the plurality of nodes.

\* \* \* \* \*